US012714018B2

(12) United States Patent
Byrne et al.

(10) Patent No.: US 12,714,018 B2
(45) Date of Patent: Aug. 25, 2026

(54) MULTI-BLADE CUTTING PLATFORM FOR ELECTRIC WALK-BEHIND MAINTENANCE APPARATUS

(71) Applicant: MTD PRODUCTS INC, Valley City, OH (US)

(72) Inventors: Nathaniel Byrne, Columbia Station, OH (US); Daniel S. Zehentbauer, Westlake, OH (US); Christian P. Emhoff, Medina, OH (US); Justin J. Chae, Strongsville, OH (US); Anthony A. Harrison, Spencer, OH (US)

(73) Assignee: MTD Products Inc, Valley City, OH (US)

( * ) Notice: Subject to any disclaimer, the term of this patent is extended or adjusted under 35 U.S.C. 154(b) by 377 days.

(21) Appl. No.: 18/376,558

(22) Filed: Oct. 4, 2023

(65) Prior Publication Data

US 2024/0107942 A1 Apr. 4, 2024

Related U.S. Application Data

(60) Provisional application No. 63/413,084, filed on Oct. 4, 2022.

(51) Int. Cl.

*A01D 34/73* (2006.01)
*A01D 34/78* (2006.01)
(Continued)

(52) U.S. Cl.

CPC ........... *A01D 34/78* (2013.01); *A01D 34/733* (2013.01); *A01D 43/063* (2013.01); *A01D 2034/6843* (2013.01); *A01D 2101/00* (2013.01)

(58) Field of Classification Search

CPC .... A01D 34/78; A01D 34/733; A01D 43/063; A01D 2034/6843

See application file for complete search history.

(56) References Cited

U.S. PATENT DOCUMENTS 3,564,824 A * 2/1971 Tygh, Jr. ................ A01D 34/73 56/295
4,254,607 A * 3/1981 Moore ................ A01D 34/826 56/295
4,292,791 A * 10/1981 Lalonde .............. A01D 34/005 56/255

(Continued)

FOREIGN PATENT DOCUMENTS

DE 10048866 A1 4/2002
EP 0014385 B1 3/1983

OTHER PUBLICATIONS

International Search Report and Written Opinion of International Application No. PCT/US2023/034427 filed Oct. 4, 2023, dated Feb. 2, 2024, 11 pages.

*Primary Examiner* — Claude J Brown
(74) *Attorney, Agent, or Firm* — Wegman Hessler

(57) ABSTRACT

A high efficiency turf maintenance apparatus having low power consumption and good cutting performance is presented herein. A multi-blade blade assembly is disclosed to reduce power consumed in driving the blade assembly and enhance longevity of a dischargeable power supply. In some aspects described herein, a first blade of the multi-blade assembly can have a first length that is greater than a second length of a second blade. Further, the first blade or the second blade can be substantially bilaterally symmetric about a rotation axis of the multi-blade assembly. In alternative or additional aspects, the second blade can provide lift within a deck of the high efficiency turf maintenance apparatus to propel turf clippings from within the mow deck through a discharge opening therein.

1 Claim, 20 Drawing Sheets

(51) Int. Cl.

| | |
|---|---|
| ***A01D 43/063*** | (2006.01) |
| *A01D 34/68* | (2006.01) |
| *A01D 101/00* | (2006.01) |

(56) References Cited

U.S. PATENT DOCUMENTS

| | | | | | |
|---|---|---|---|---|---|
| 4,426,831 | A * | 1/1984 | Klas | A01D 34/73 56/295 |
| 5,109,656 | A * | 5/1992 | Zimmer | A01D 34/73 56/295 |
| 5,148,660 | A * | 9/1992 | Will | A01D 34/73 56/DIG. 17 |
| 5,209,052 | A * | 5/1993 | Carroll | A01D 34/73 56/DIG. 17 |
| 5,287,686 | A * | 2/1994 | Lindsay | A01D 34/73 56/255 |
| 5,454,216 | A * | 10/1995 | Myszka | A01D 34/733 56/255 |
| 5,832,704 | A * | 11/1998 | Routh | A01D 34/003 56/13.4 |
| 5,946,895 | A * | 9/1999 | Martens | A01D 34/733 56/DIG. 20 |
| 6,301,868 | B1 * | 10/2001 | Siplinger | A01D 34/73 56/255 |
| 6,655,119 | B2 * | 12/2003 | Hasei | A01D 34/826 56/DIG. 17 |
| 7,392,643 | B2 * | 7/2008 | Warashina | A01D 34/826 56/DIG. 17 |
| 9,113,595 | B2 * | 8/2015 | Roth | A01D 34/664 |
| D755,858 | S * | 5/2016 | Brown | D15/17 |
| 9,480,200 | B1 | 11/2016 | Patridge | |
| 10,285,328 | B2 * | 5/2019 | Kurioka | A01D 34/68 |
| 11,388,857 | B2 * | 7/2022 | Kurihara | A01D 34/63 |
| 2003/0041582 | A1 * | 3/2003 | Plamper | A01D 34/733 56/295 |
| 2006/0150609 | A1 * | 7/2006 | Igl | A01D 34/733 56/295 |
| 2012/0198807 | A1 * | 8/2012 | Upham | A01D 34/73 56/289 |
| 2013/0327007 | A1 * | 12/2013 | Eavenson, Sr. | A01D 34/63 56/295 |
| 2020/0404840 | A1 | 12/2020 | Xu et al. | |

* cited by examiner

EXAMPLE WALK-BEHIND MOWER
100

OPERATOR HANDGRIP
122

OPERATOR HANDLES
120

BAGGING APPARATUS
130

MOTOR AND BATTERY HOUSING
115

MOWER BODY
110

REAR WHEELS
102

132
DISCHARGE CHUTE

104
FRONT WHEELS

MULTI-BLADE ASSEMBLY FOR MOW DECK
200

GRASS CUT PER BLADE PER REVOLUTION Dt
600

MULTI-BLADE ASSEMBLY – BLADE ADAPTER, BOTTOM VIEW
800A

EXAMPLE CUT-OUT PATTERN FOR BOTTOM BLADE
1300

MULTI-BLADE CUTTING PLATFORM FOR ELECTRIC WALK-BEHIND MAINTENANCE APPARATUS

INCORPORATION BY REFERENCE

This application claims the benefit of U.S. Provisional Application No. 63/413,084, filed Oct. 4, 2022. The following are hereby incorporated by reference within the present disclosure in their respective entireties and for all purposes: U.S. patent application Ser. No. 17/700,255 filed Mar. 21, 2022 and titled BAGGING APPARATUS FOR HIGH-EFFICIENCY LAWN MAINTENANCE TOOL, U.S. Provisional Patent Application No. 63/163,386 filed Mar. 19, 2021, and U.S. Pat. No. 10,212,880 issued Feb. 26, 2019 and titled HIGH EFFICIENCY CUTTING SYSTEM.

FIELD OF DISCLOSURE

The disclosed subject matter pertains to an electric-powered walk-behind power equipment device with a mow deck and cutting system that enhances cutting efficiency and reduces power consumption for the power equipment device.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly. For example, mowing machines suitable for sporting events requiring moderately precise turf, such as soccer fields or baseball outfields may not be suitable for events requiring very high-precision surfaces such as golf course greens, tennis courts and the like.

Modern maintenance machines also offer multiple options for power source. The various advantages associated with electric motors, gasoline engines, natural gas engines, diesel engines and so forth also impact the mechanical design and engineering that go into these different maintenance devices. Meeting the various challenges associated with different maintenance and mowing applications and the benefits and limitations of different power sources results in a large variety of maintenance machines to meet consumer preferences.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

The present disclosure provides a walk-behind turf maintenance apparatus. The walk-behind turf maintenance apparatus can be a high efficiency (HE) electric powered machine adapted to minimize power consumption thereof, and as a result enhance longevity of a rechargeable power supply mounted to the HE electric powered machine. In some aspects of the disclosed embodiments, the walk-behind turf maintenance apparatus can comprise a multi-blade assembly secured to an output of an electric motor. The multi-blade assembly platform can comprise a plurality of blades configured to lower power consumption associated with rotating the plurality of blades by the electric motor. A first blade can be a flat blade that does not provide significant lift force and minimizes drag on the first blade. A second blade can have a curved perimeter that adds lift force to turf clippings within an interior of a mow deck to facilitate ejection of turf clippings to a bagging apparatus. Furthermore, the first blade and second blade can have different lengths in some aspects, and at their perimeters can have differing heights above the ground, in still further aspects.

In an aspect of the disclosed embodiments, the subject specification discloses a grass mowing apparatus. The grass mowing apparatus can comprise a plurality of front wheels and a plurality of rear wheels, a mow deck, and an operator handle secured to the mow deck near the plurality of rear wheels. The grass mowing apparatus can comprise an electric motor secured to the mow deck and powered by a rechargeable power supply to generate mechanical power at a drive output of the electric motor. Further, the grass mowing apparatus can comprise a multi-blade assembly secured to the drive output of the electric motor, the multi-blade assembly comprising a first blade having a first length and a second blade having a second length. In addition, the grass mowing apparatus can comprise a blade adapter platform that secures the first blade and the second blade to the drive output, with the second blade underlying the first blade; wherein the first length of the first blade is greater than the second length of the second blade.

In further embodiments, disclosed is a multi-blade assembly for a walk-behind power equipment device. The multi-blade assembly can comprise a first blade having a first length and a second blade having a second length. Additionally, the multi-blade assembly can comprise a blade adapter platform that secures the first blade in a fixed orientation relative to the second blade, with the second blade underlying the first blade, wherein the first length of the first blade is greater than the second length of the second blade.

To accomplish the foregoing and related ends, certain illustrative aspects of the disclosure are described herein in connection with the following description and the drawings. These aspects are indicative, however, of but a few of the numerous ways in which the principles of the disclosure can be employed and the subject disclosure is intended to include all such aspects and their equivalents. Other advantages and features of the disclosure will become apparent from the following detailed description of the disclosure when considered in conjunction with the drawings.

Figure 1:
FIG. 1 provides an example electric-powered walk-behind outdoor maintenance apparatus according to one or more aspects of the present disclosure.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to cutting systems for power equipment machines are described herein, it should be understood that the disclosed machines and methods are not so limited and modifications may be made without departing from the scope of the present disclosure. The scope of the systems, methods, and components for cutting systems are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of robotic, partially robotic ride-on, walk-behind, sulky equipped, autonomous, semi-autonomous (e.g., user-assisted automation), remote control, or multi-function variants of any of the following: lawn mowers, lawn and garden tractors, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, powered carts and wheelbarrows, lawn equipment, garden equipment, driveway sprayers and spreaders, and sports field marking equipment.

As utilized herein, relative terms and terms of degree including the term "about", "approximately", "substantially", "roughly", "near" and others are intended to incorporate ranges and variations about a qualified term reasonably encountered by one of ordinary skill in the art in fabricating, compiling or optimizing the embodiments disclosed herein to suit design preferences, where not explicitly specified otherwise. When utilized to modify a numerical description of a disclosed element, a relative term can imply a suitable range about the given number. Any implied range is intended to be consistent with and achieve the same or similar functions as described for the disclosed structure given the numerical description, where applicable. Where such ranges are not explicitly disclosed, a range within typical manufacturing tolerances associated with suitable manufacturing equipment (e.g., injection molding equipment, extrusion equipment, metal stamping equipment, and so forth) understood by one of ordinary skill in the art for realizing an element from a disclosed illustration or description can be implied. In some embodiments, depending on context and the capabilities of one of ordinary skill in the art, relative terminology can refer to a variation in a disclosed value or characteristic; e.g., a zero to five-percent variance or a zero to ten-percent variance from precise mathematically defined value or characteristic, or any suitable value or range there between can define a scope for a disclosed term of degree. As an example, a disclosed mechanical dimension can have a variance of suitable manufacturing tolerances as would be understood by one of ordinary skill in the art, or a variance of a few percent about the disclosed mechanical dimension that would achieve a stated purpose or function of the disclosed mechanical dimension. Relative terms utilized for qualitative (rather than quantitative) description can be understood to imply explicitly stated alternatives or variations, variations understood in the art to occur from manufacturing tolerances or variations in a manufacturing process, variations understood in the art to achieve the function or purpose described for a particular component or process, or a suitable combination of the foregoing.

FIG. 1 provides an image of an example walk-behind mower 100 according to aspects of the present disclosure. Walk-behind mower 100 can have a power source to drive an implement of walk-behind mower 100, and in some embodiments to drive rear wheels 102 or front wheels 104 of walk-behind mower 100. The power source can be an electric motor powered by a rechargeable electric power source, a fixed plug-in electric power source, or the like, although the subject disclosure is not so limited. In at least some disclosed embodiments, however, a power source of walk-behind mower 100 can be a combustion engine such as a gasoline engine, a natural gas engine, or the like, or can be a hydraulic engine, pneumatic engine, and so forth. In electric powered embodiments, a power source of walk-behind mower 100 can have one or more electric motors for driving a blade apparatus of walk-behind mower 100, and can optionally drive front wheels 104 or rear wheels 102 to facilitate powered motion of walk-behind mower 100.

A mower and battery housing 115 can contain the power source (e.g., engine, motor, etc.) and electric batteries in an electric powered lawn mower embodiment(s) of walk-behind mower 100. Further, a mower body 110 can house a multi-blade assembly platform that extends from a mechanical output of the power source into an underside of walk-behind mower 100, including two or more blades for cutting vegetation under the mower body 110. Cuttings from the vegetation—also referred to herein as turf clippings—can be discharged from mower body 110 through a discharge chute 132 (depicted on a right side of mower body 110 in the illustration of FIG. 1 but can be located on various positions of mower body 110 in other embodiments). In some embodiments, a bagging apparatus 130 can be coupled to the discharge chute 132 to collect turf clippings in a container. In other embodiments, the discharge chute 132 can be closed or plugged to prevent discharge of turf clippings through the discharge chute 132. In these latter embodiments, referred to as a mulching operation mode, the turf clippings can be maintained within the underside of mower body 110 and cut multiple times by the multi-blade assembly into small pieces which can be ejected to the ground under the mower body 110, or ejected from a mulching ejection port, or the like.

Walk-behind mower 100 includes a set of operator handles 120 secured to mower body 110 at a first end of operator handles 120. In some embodiments of the present disclosure, operator handles 120 enable an operator to direct or push mower body 110 and front and rear wheels 102, 104 from an operator handgrip 122. In at least one embodiment, operator handles 120 can collapse and extend to facilitate compact storage of walk-behind mower 100 when not in use and efficient control over walk-behind mower 100 when in use, respectively. Operator handles 120 can be configured to lock in a fully collapsed position and to separately lock in a full extended position, in aspects of such embodiments.

Figure 2:
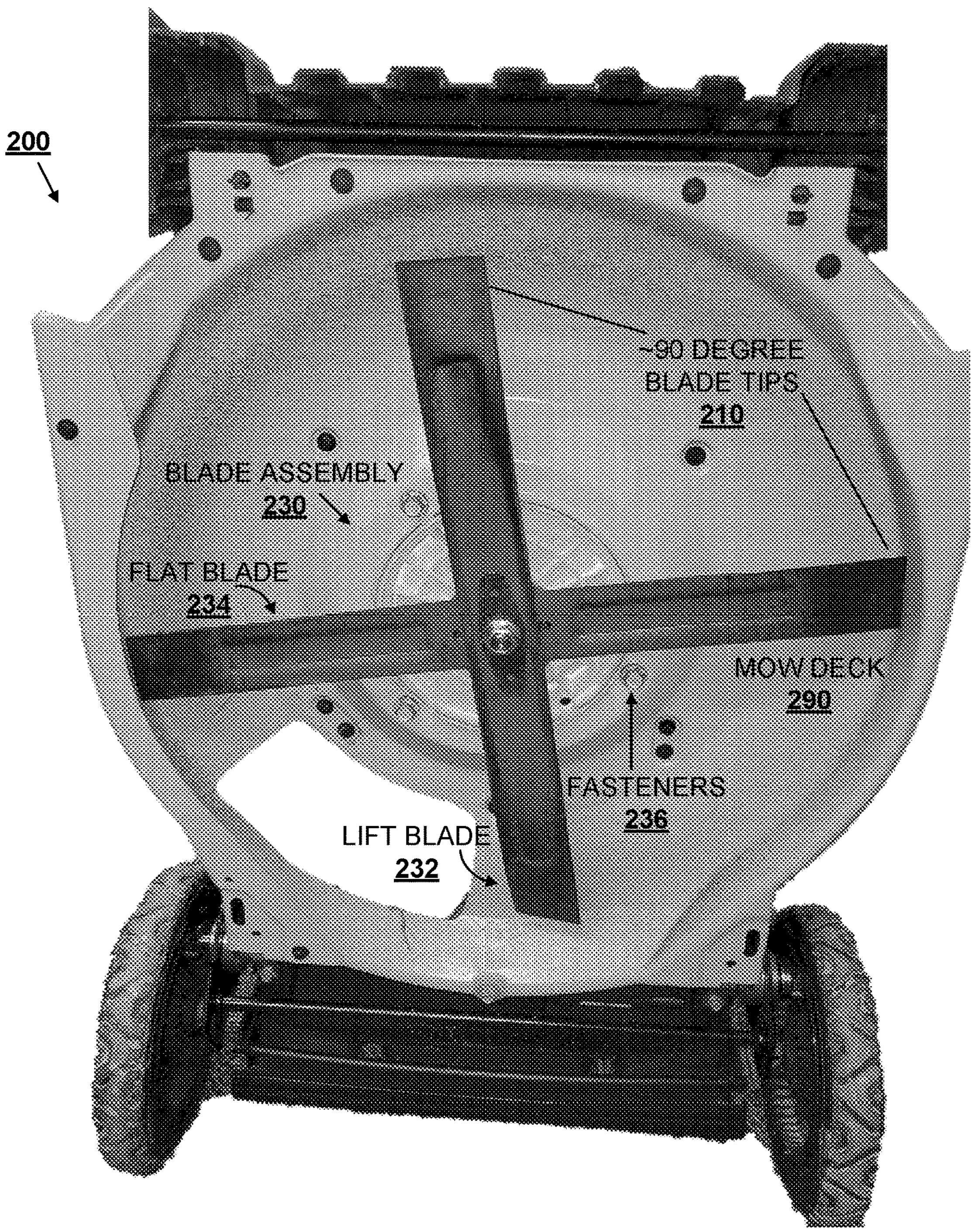
FIG. 2 illustrates a bottom view of an example mow deck and multi-blade assembly of a high efficiency walk-behind mowing device according to further aspects.

FIG. 2 provides an image of a multi-blade assembly platform 200 for a walk-behind mower 100 according to further embodiments of the present disclosure. Multi-blade assembly platform 200 is shown through a bottom view of mower body 110, and includes a blade assembly 230 comprising a flat blade 234 and a lift blade 232. Flat blade 234 can be substantially level along its length dimension, whereas lift blade 232 can have edges that are bent upward near a perimeter(s) of the lift blade 232 to create upward force on turf clippings within mow deck 210 in response to rotation of blade assembly 230. In the depicted embodiment, edges of flat blade 234 and lift blade 232 can be rotationally displaced by ninety degrees or about ninety degrees, as illustrated. In alternative or additional embodiments, one end of lift blade 232 can be rotationally displaced from a second end of flat blade 234 by an angle within a range from about 70 degrees to about 110 degrees, or any suitable value (e.g., 75, 80, 85, 90, 95, 100, 105, etc.) or range there between (e.g., 75-105; 80-100; 85-95, etc.). As shown blade assembly 230 can be secured to mow deck by way of fasteners 236.

Figure 3:
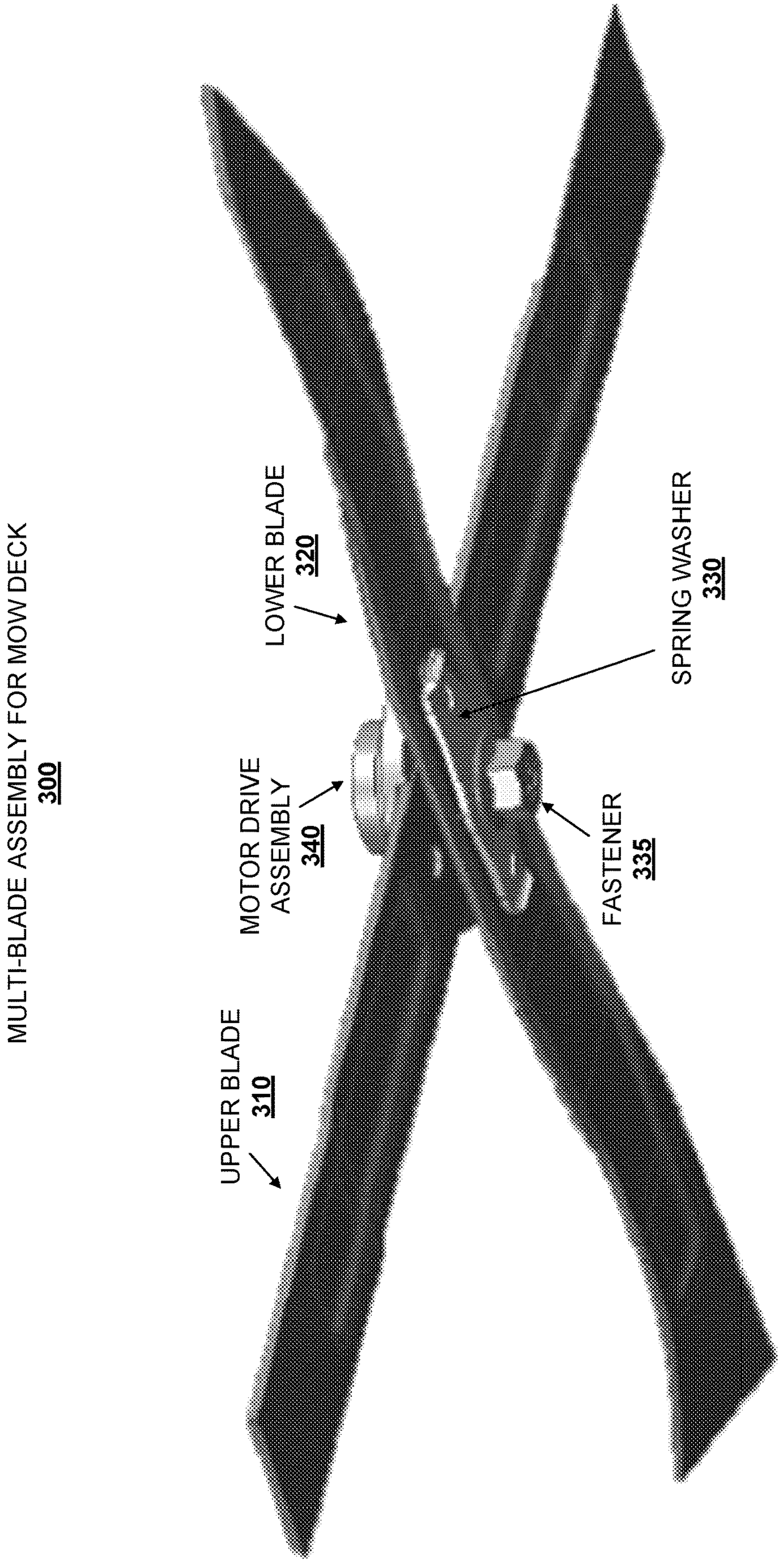
FIG. 3 depicts a perspective view of an example multi-blade assembly for the example high efficiency walk-behind mowing device in still further aspects.

FIG. 3 illustrates a close-up view of a multi-blade assembly 300 for a mow deck of a walk-behind mowing apparatus according to alternative or additional aspects of the disclosed embodiments. Multi-blade assembly 300 illustrates an upper blade 310 and a lower blade 320 secured by a blade adapter (see FIGS. 7-13, infra), a spring washer 330 and fastener 335 to a motor drive assembly 340. Motor drive assembly 340 in turn is secured to the mow deck (e.g., by fasteners 236 of FIG. 2, supra) and secures multi-blade assembly 300 to the mow deck.

The blade adapter can be configured to secure upper blade 310 and lower blade 320 in a fixed orientation relative to each other. Additionally, the blade adapter can rotatably secure upper blade 310 and lower blade 320 to a drive output (e.g., drive shaft, etc.) of motor drive assembly 340 such that in response to rotation of the drive output of motor drive assembly 340, upper blade 310 and lower blade 320 will also rotate to facilitate cutting turf, vegetation or the like within the mow deck of the walk-behind mowing apparatus.

Figure 4:
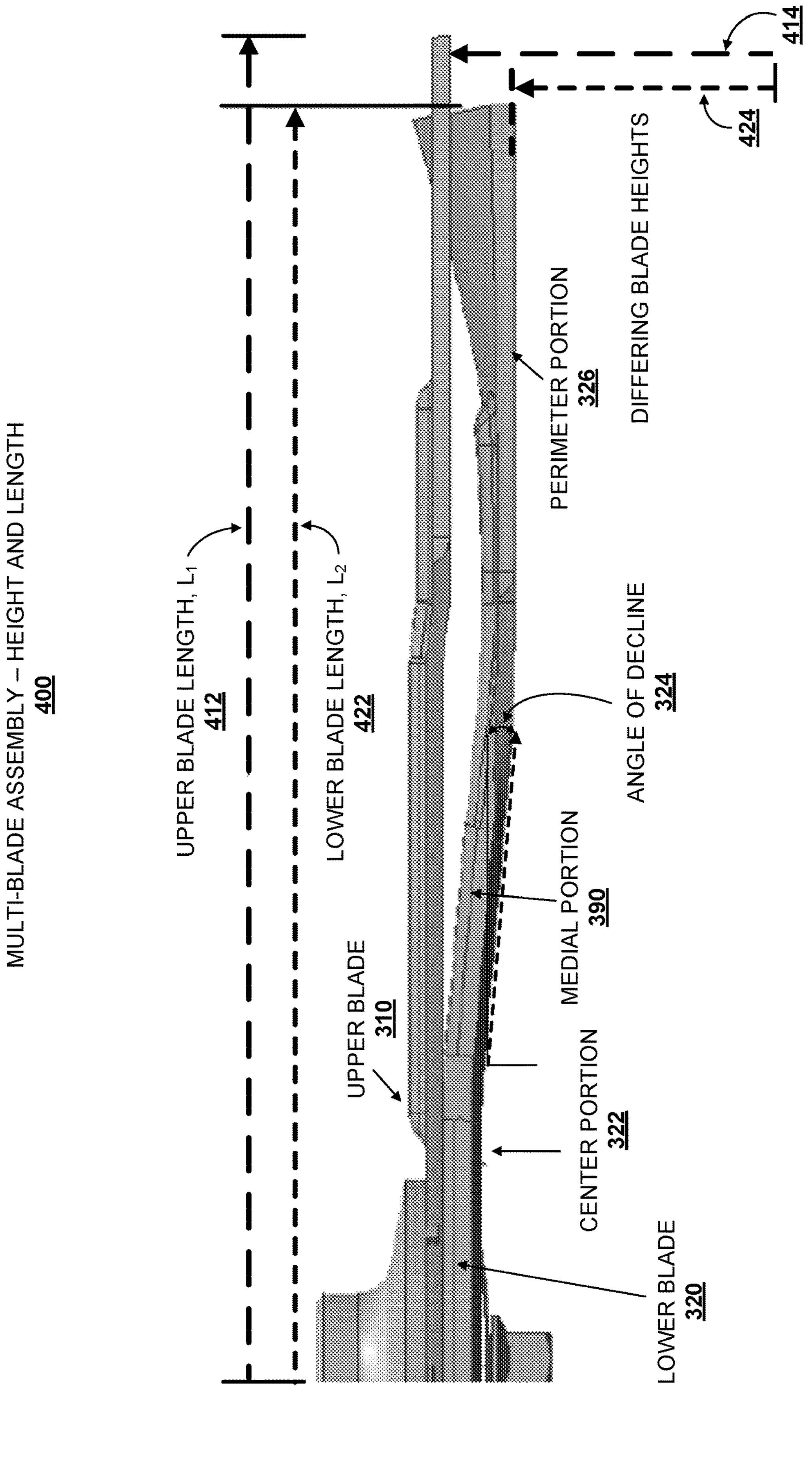
FIG. 4 illustrates a vertical comparative view of blades of the multi-blade assembly according to additional aspects of the disclosure.
Figure 5:
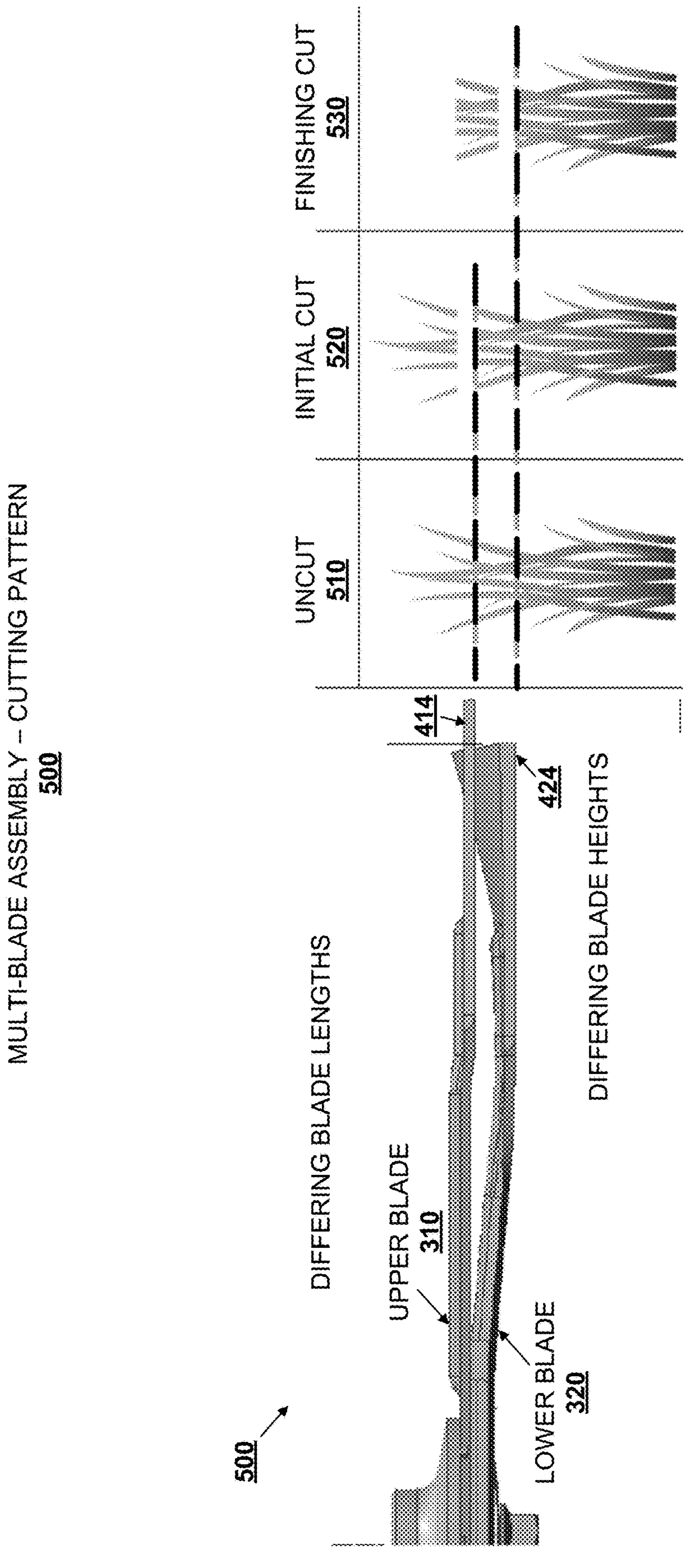
FIG. 5 depicts an example cutting performance of the multi-blade assembly illustrating the vertical comparative view of FIG. 4, according to one or more aspects.

FIG. 4 depicts a vertical comparative view 400 of upper blade 310 and lower blade 320 of multi-blade assembly 300 showing the relative length and relative height above ground of upper blade 310 and lower blade 320. Note that vertical comparative view 400 of FIG. 4 (and of FIG. 5, infra) is not a true side-view of multi-blade assembly 300 as the upper blade 310 and lower blade 320 are spaced apart about a center of rotation of multi-blade assembly 300 and do not directly overlap each other as shown in FIGS. 4 and 5. Thus, the illustration shown is merely a comparative view showing upper blade 310 vertically overlapping lower blade 320 merely to illustrate the vertical relationship of the blades without regard to their rotational orientation about the center of rotation of multi-blade assembly 300. In operation, multi-blade assembly 300 includes upper blade 310 and lower blade 320 spaced apart by one or more angles about the center of rotation of multi-blade assembly 300 (e.g., see displacement $angle_1$ 830A and displacement $angle_2$ 830B of FIG. 8, infra).

Upper blade 310 has a first length, $L_1$ 412 measured from a center of rotation of motor drive assembly 340 and a blade tip of upper blade 310. Likewise, lower blade 320 has a second length, $L_2$ 422 measured from the center of rotation of motor drive assembly 340 and a blade tip of lower blade 320. In the depicted embodiment(s), first length, $L_1$ 412 of upper blade 310 can be greater than second length, $L_2$ 422 of lower blade 320. A difference in lengths $L_1$ 412-$L_2$ 422 can be in a range of about 0.4 inches to about 0.75 inches in at least one embodiment, or any suitable value or range there between (e.g., 0.41, 0.42, 0.43, . . . 0.51, 0.52, 0.53, . . . 0.61, 0.62, 0.63, . . . 0.71, 0.72, 0.73, . . . etc.). However, the subject disclosure is not so limited, and in other embodiments first length, $L_1$ 412 of upper blade 310 can be equivalent to (or substantially equivalent to) second length, $L_2$ 422, or even smaller than second length, $L_2$ 422 in at least some embodiments (not depicted).

Further to the above, side-view 400 shows differing relative blade heights—compared to a common ground level when multi-blade assembly 300 is mounted to a walk-behind mower 100—of upper blade 310 and lower blade 320 at respective perimeters thereof. Thus, at the perimeter of upper blade 310 shown in FIG. 4, upper blade 310 has a blade height 414 relative to the common ground level. In addition, the perimeter of lower blade 320 has a blade height 424 relative to the common ground level. As is evident from the illustration, blade height 414 of upper blade 310 can be greater than blade height 424 of lower blade 320. In various embodiments, a difference in blade height: blade height 414–blade height 424 can be within a range of about 0.25 inches and about 1.0 inch, or any suitable value or range there between (e.g., 0.3, 0.35, . . . 0.5, 0.55, . . . 0.85, 0.9, 0.95, etc.).

Because of the difference in length and height of upper blade 310 compared to lower blade 320 a differential cutting pattern is created by multi-blade assembly 300. This cutting pattern is illustrated in more detail at FIGS. 5 and 6, infra. The cutting pattern can enhance cutting efficiency of multi-blade assembly 300, reducing mechanical power consumption associated with operation thereof and enhancing longevity of rechargeable power supply devices in an electric power maintenance apparatus.

In addition to the foregoing, lower blade 320 is shown having three portions, including a center portion 322, a medial portion 390 and a perimeter portion 326. The portions define segments of lower blade 320 having distinct structural characteristics. Center portion 322 is generally flat along its length dimension. Center portion 322 provides a preferred segment of lower blade 320 for mounting and securing lower blade 320 to another structure-such as upper blade 310, blade adapter, and so forth—due to the generally flat surface yielding a consistent shape-predictability for attachment or mounting structures formed in center portion 322 (e.g., see FIG. 13, infra). Medial portion 390 in contrast has a downward curvature causing lower blade 320 to drop below the generally flat surface of center portion 322, as shown. An angle of decline 324 can be a few degrees in various embodiments (e.g., 1-10 degrees, or any suitable value or range there between; about 2-8 degrees; about 3-6 degrees; about 4 degrees, about 5 degrees, about 6 degrees, and so on). Perimeter portion 326 no longer continues the angle of decline 324 of medial portion 390, but instead is generally flat, at least at a cutting edge thereof (e.g., a leading edge, with respect to direction of rotation). In some embodiments, a trailing edge (or non-cutting edge) of perimeter portion 326 can have an upward curvature, at least near an outer edge of perimeter portion 326. The upward curvature of the trailing edge can generate upward force on a fluid medium (e.g., air, another gas, and so forth) interacting with perimeter portion 326, creating lift for turf clippings cut by multi-blade assembly 300 within the mow deck. This lift can facilitate ejection of turf clippings through a discharge chute 132 toward a bagging apparatus 130, such as shown in FIG. 1, supra.

FIG. 5 illustrates an example cutting pattern 500 for a multi-blade assembly 300 described herein according to further aspects of the disclosed embodiments. In operation, with some variability based on movement speed which is ignored for simplicity of explanation, the greater length 412 of upper blade 310 will generally cause turf to be cut first by upper blade 310. Subsequently, the shorter lower blade length $L_2$ 422 and lower blade height 424 of lower blade 320 results in a second or further cut to a desired turf height.

Turf is depicted in an uncut state 510 prior to any interaction with multi-blade assembly 300. Thus, uncut state 510 shows turf in having their greatest height and least uniformity. An initial cut state 520 follows initial interaction of upper blade 310 with the turf. As shown, upper blade 310 makes a cut at blade height 414 during initial cut state 520. Subsequently, a finishing cut state 530 occurs when lower blade 320 makes a second cut at blade height 424, as shown. The result produces turf having a maximum height equal approximately to the blade height 424 of lower blade 320.

Figure 6:
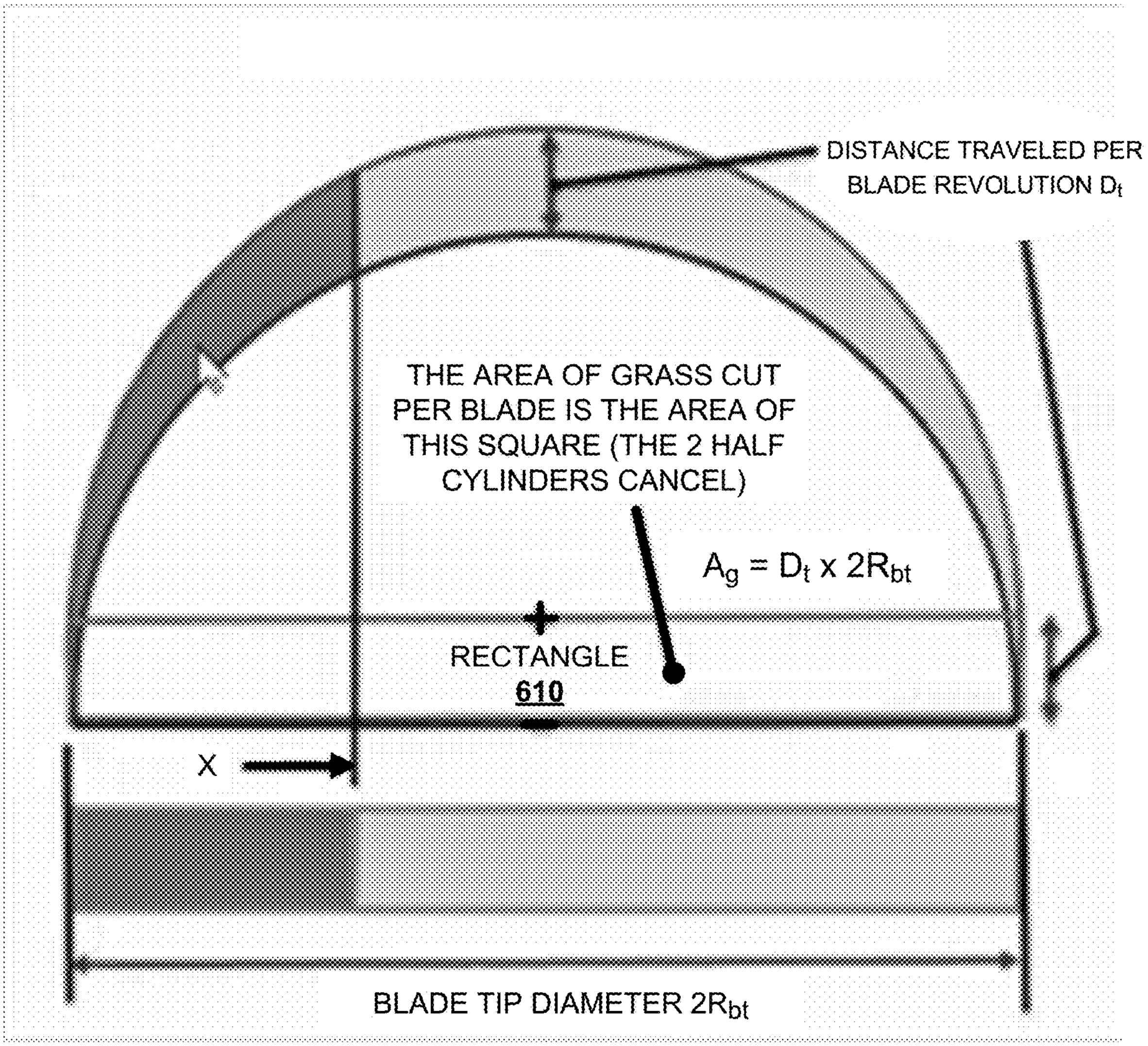
FIG. 6 depicts an example diagram of an area of grass cut per blade revolution for the multi-blade assembly.

FIG. 6 illustrates an example diagram 600 of area of grass A g cut per revolution of a cutting blade tip. Diagram 600 shows the area of grass cut per blade tip as being equal to the area of rectangle 610 that is defined by a distance traveled per blade revolution: $D_t$ multiplied by a diameter of the blade tip or twice the radius of the blade tip: $2R_{bt}$. Thus, $A_g = D_t \times 2R_{bt}$ according to the model of FIG. 6. To compare with the model of rectangle 610, distance traveled per blade revolution $D_t$ defines the width of rectangle 610 and the blade tip diameter $2R_{bt}$ defines the length of rectangle 610.

Figure 7:
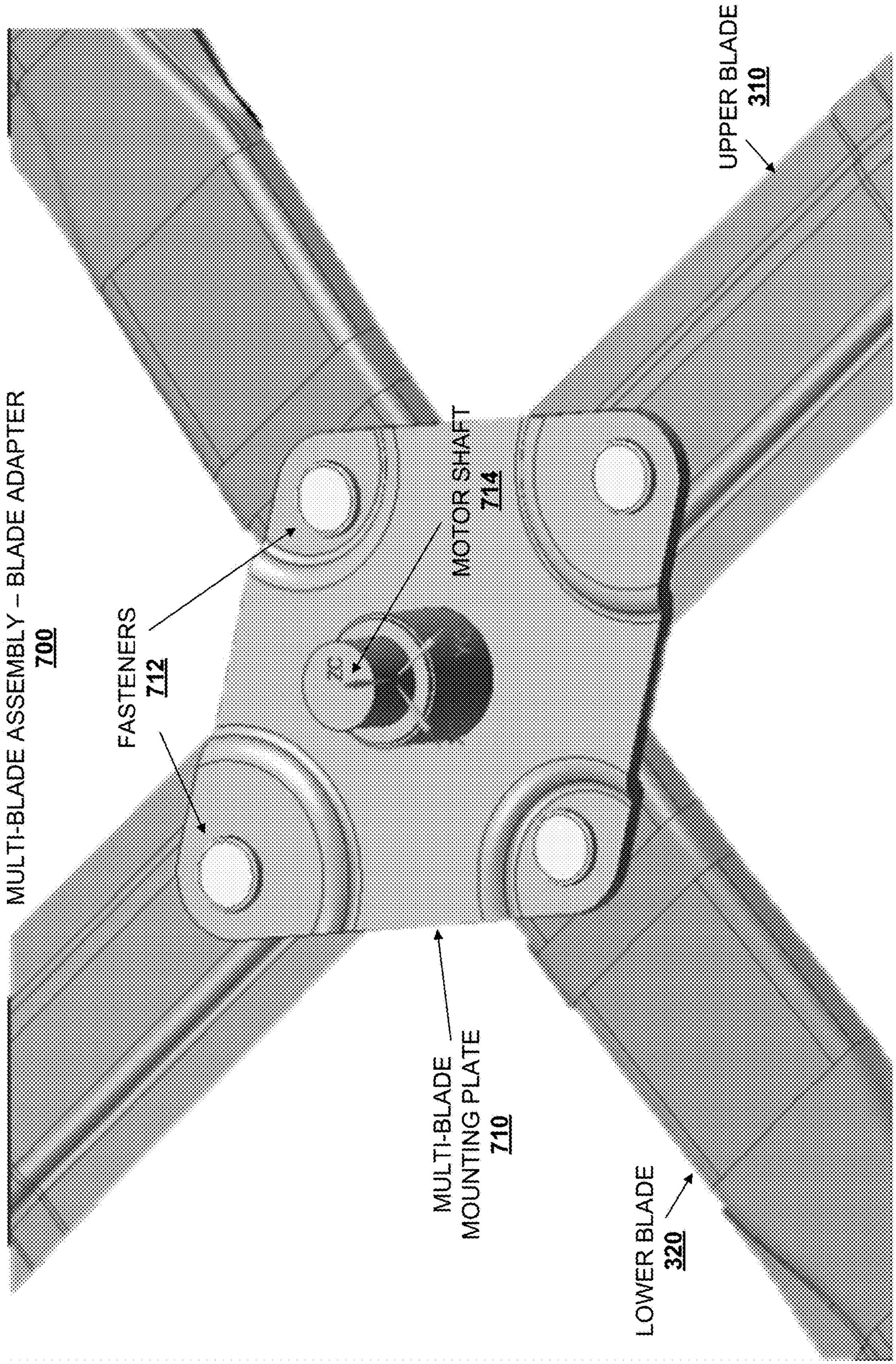
FIG. 7 illustrates a perspective view of a multi-blade assembly and blade adapter according to one or more additional aspects of the present disclosure.

FIG. 7 depicts a blade adapter 700 for a multi-blade assembly according to alternative or additional embodiments of the present disclosure. Blade adapter 700 is configured to provide structural integrity to cutting blades that complies with regulations governing power-driven mowing devices. Additionally, blade adapter 700 is configured to secure multiple blades to a drive shaft of a mechanical power source, such as an electric motor, combustion engine, and so forth.

Blade adapter 700 includes a multi-blade mounting plate 710 and fasteners 712 for securing blade adapter 700 to upper blade 310 and lower blade 320. Blade adapter 700 depicts an embodiment in which blade adapter 700 comprises two fasteners 712 for each of upper blade 310 and lower blade 320, yielding in four total fasteners 712. Fasteners 712 can include a bolt—such as an anchor bolt, arbor bolt, carriage bolt, hex bolt, hanger bolt, lag bolt, shoulder bolt, U-bolt, and so forth—a mounting pin, a rod, a screw, a nail, or other fastener, or a suitable combination of the foregoing.

In some aspects the structural integrity provided by the blade adapter, either blade adapter 700 or other blade adapter aspects as provided herein, may be substantial enough to permit substantial reduction in the thickness of the blades engaged therewith while still maintaining a total blade assembly integrity needed for appropriate operation. The latter latitude to permit a reduction in thickness is of interest as it may permit blade assemblies with reduced moment of inertia or air resistance. One such assembly has a set of steel blades having a first blade with a thickness of 0.125 inches and a second blade having a thickness of 0.1 inches.

Figure 7A:
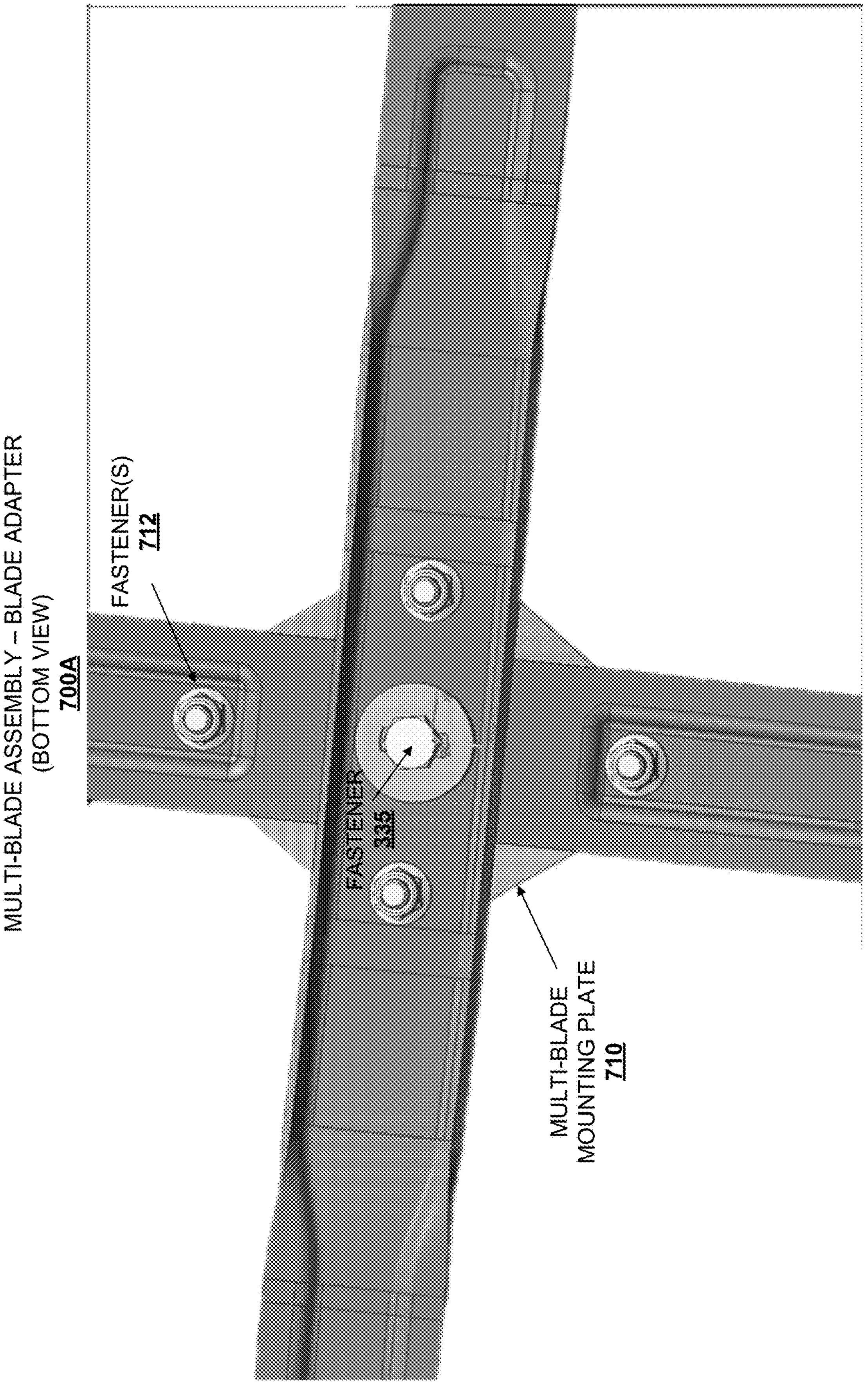
FIG. 7A depicts a bottom view of the multi-blade assembly and blade adapter of FIG. 7.

In addition to the above, a motor shaft 714 can be secured to blade adapter 700. In an embodiment, motor shaft 714 can extend through a center of blade adapter 700 and secure to a fastener on an underside of blade adapter 700. For instance, as shown in FIG. 7A a bottom view 700A of blade adapter 700 is shown. A bottom of motor shaft 714 is secured to a fastener 335. Fastener 335 can also, in part, secure blade adapter 700 to one or more blades. Additionally, fastener(s) 712 are shown further securing blades to blade adapter 700. It should be understood that fastener(s) 712 are illustrated in a nut-and-bolt embodiment, but the subject disclosure is not so limited and other means for fastening the blades to blade adapter 700 can be utilized instead or in addition.

Figure 8:
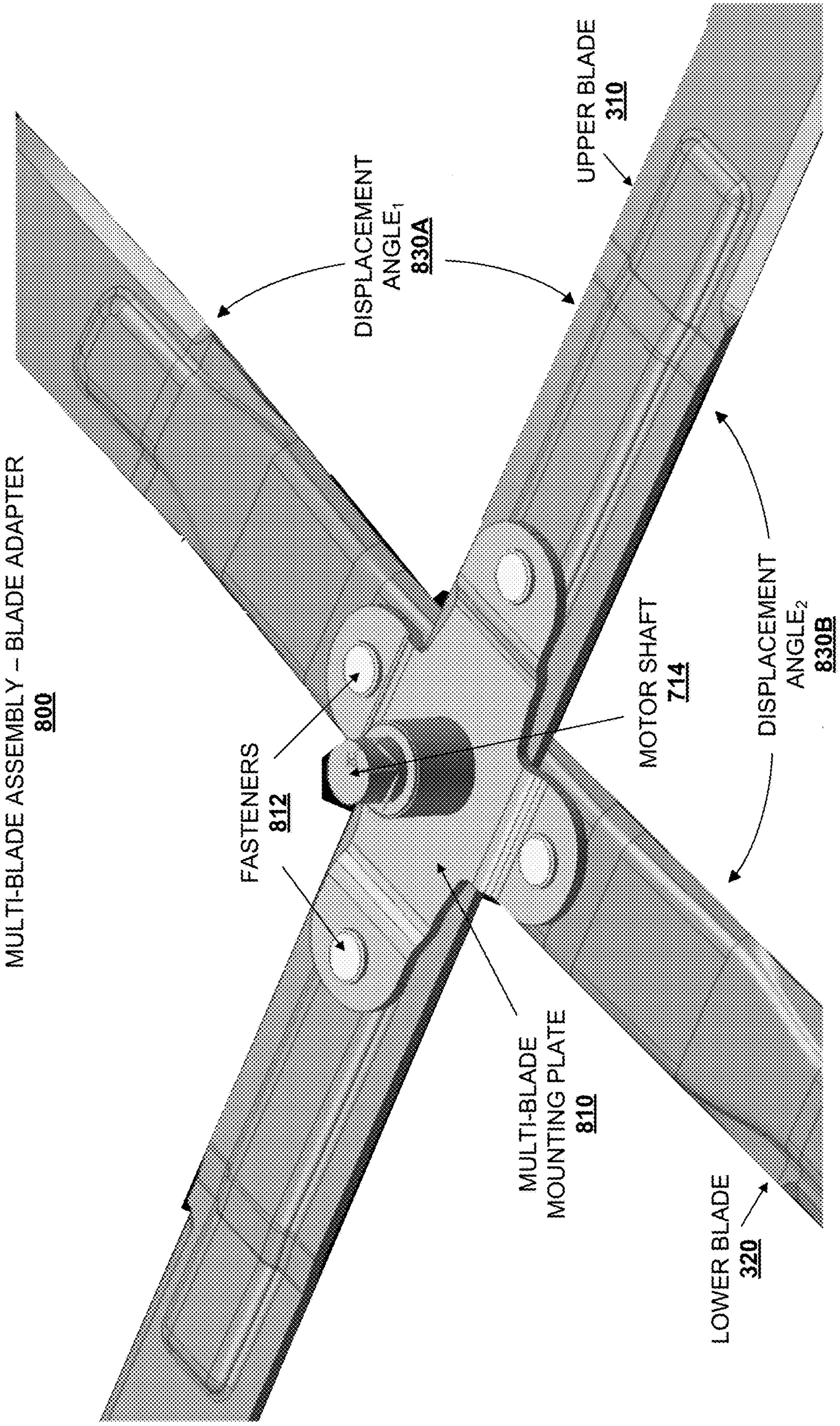
FIG. 8 illustrates a top-perspective view of the multi-blade assembly and a blade adapter according to still additional aspects of the present disclosure.

FIG. 8 illustrates a blade adapter 800 according to one or more additional aspects of the disclosed embodiments. For instance, blade adapter 800 can have a multi-blade mounting plate 810 with a surface area contained or substantially contained within a footprint of upper blade 310 and lower blade 320. Fasteners 812 and motor shaft 714 can be the same or similar to the description provided at FIG. 7, supra. However, the subject disclosure is not so limited, and different fasteners 812 can be utilized for blade adapter 800 in one or more aspects, or a different mechanical coupling to motor shaft 714 can be implemented in still other aspects.

As shown in FIG. 8, a first displacement $angle_1$ 830A defines a rotational displacement between a first end of lower blade 320 and a first end of upper blade 310. A second displacement $angle_2$ 830B defines a rotational displacement between a second end of lower blade 320 and a second end of upper blade 310. In some aspects of the disclosed embodiments, first displacement $angle_1$ 830A can have the same or substantially the same value as second displacement $angle_2$ 830B. In other aspects of the disclosed embodiments, first displacement $angle_1$ 830A can have a different value from second displacement $angle_2$ 830B. In an embodiment, first displacement $angle_1$ 830A or second displacement $angle_2$ 830B can be ninety degrees or approximately ninety degrees. In another embodiment, first displacement $angle_1$ 830A or second displacement $angle_2$ 830B can be in a range from about seventy degrees and about one hundred and ten degrees. In yet another embodiment, first displacement $angle_1$ 830A can have a value in a first range between about seventy degrees and about one hundred and ten degrees and the second displacement $angle_2$ 830B can have a second value=180 degrees−the value of first displacement $angle_1$ 830A.

Figure 8A:
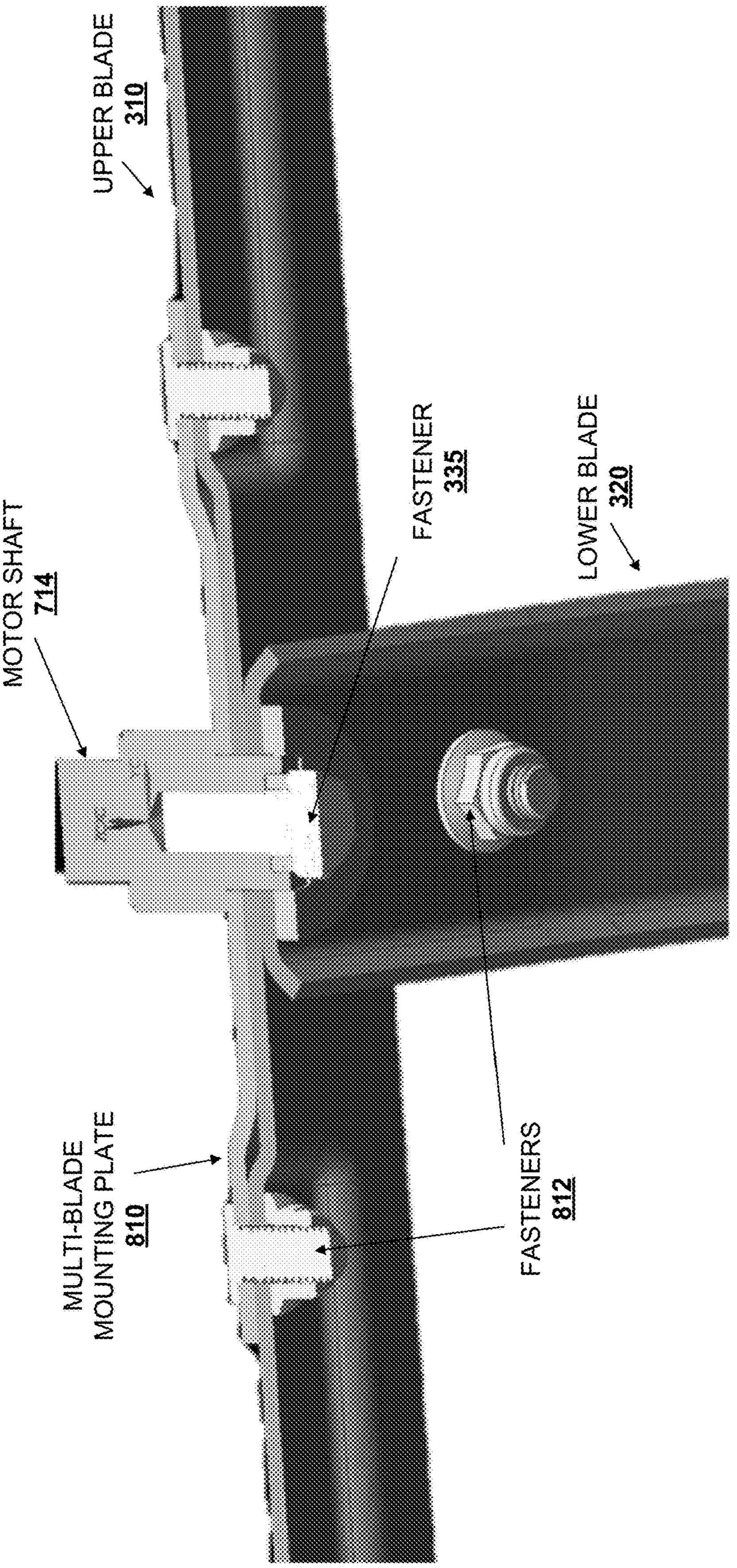
FIG. 8A depicts a bottom view of the multi-blade assembly and blade adapter of FIG. 8 according to further disclosed aspects.

Referring to FIG. 8A, there is shown a bottom view 800A of blade adapter 800. Bottom view 800A shows a terminal end of motor shaft 714 extending through a center of multi-blade mounting plate 810 and upper blade 310 and lower blade 320. A fastener 335 secures upper blade 310, lower blade 320 and multi-blade mounting plate 810 to motor shaft 714. Meanwhile, fasteners 812 secure upper blade 310 and lower blade 320 to multi-blade mounting plate 810.

Figure 9:
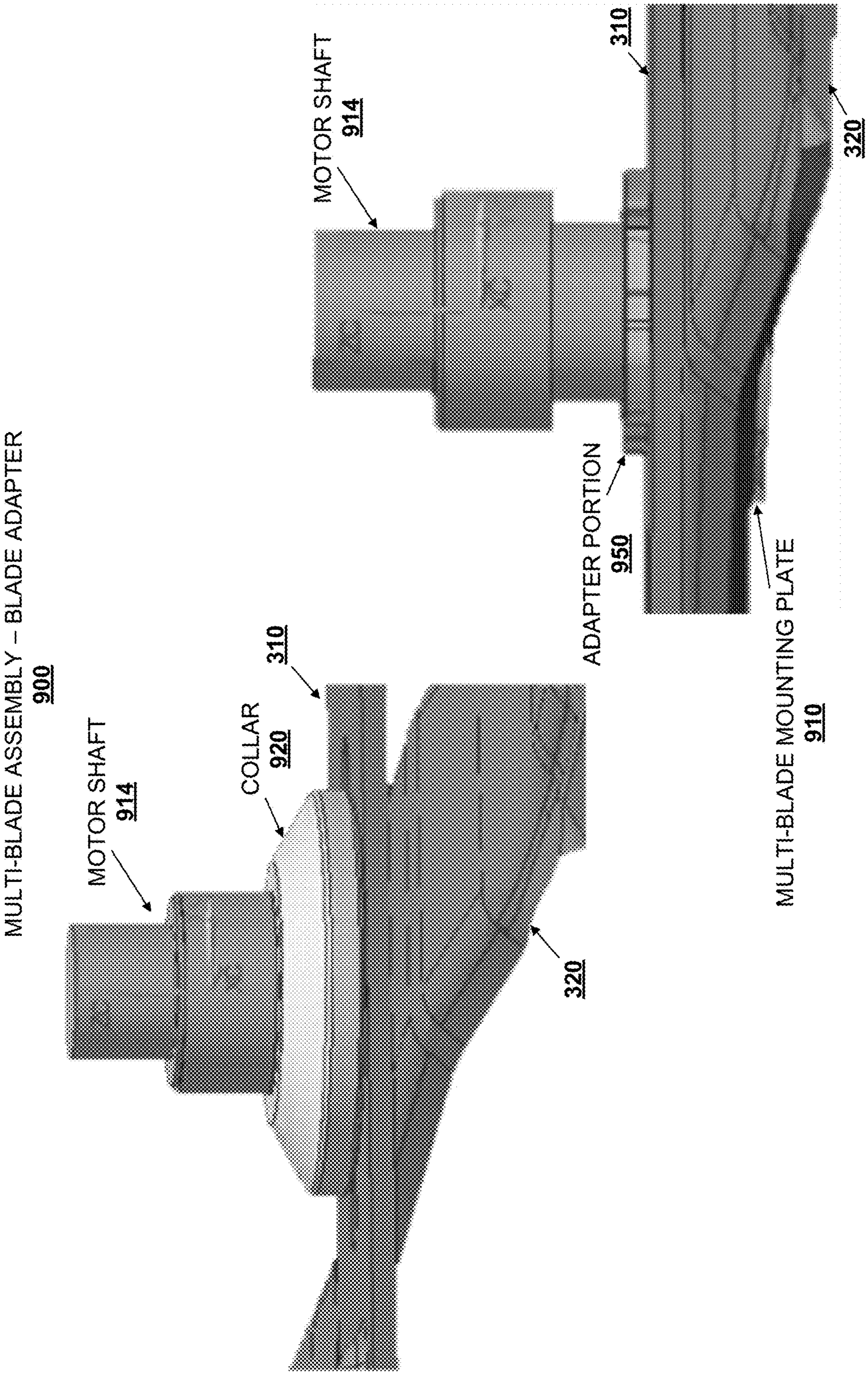
FIG. 9 depicts a blade adapter engaged with upper and lower blades of a multi-blade assembly in an aspect(s).

FIG. 9 illustrates a side view of a blade adapter 900 according to further embodiments of the present disclosure. Blade adapter 900 depicts a collar 920 surrounding motor shaft 914 and overlying upper blade 310 and lower blade 320. The bottom illustration shows collar 920 removed, revealing a side view of an adapter portion 950. Adapter portion 950 is situated within a central cutout of upper blade 310 and lower blade 320, as is shown in more detail in FIGS. 11 and 13. A multi-blade mounting plate 910 is situated beneath lower blade 320.

Figure 10:
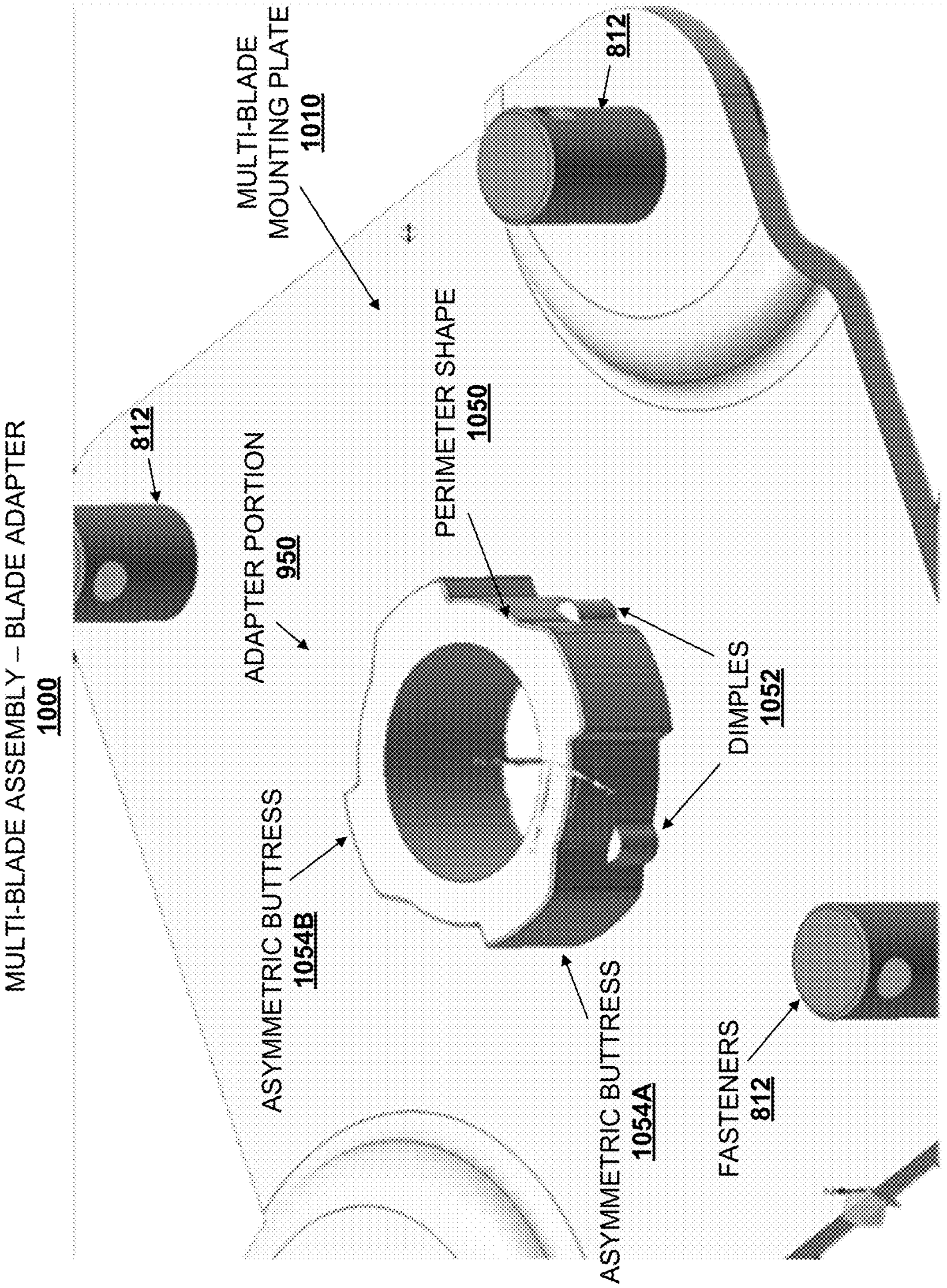
FIG. 10 depicts a blade adapter for a multi-blade assembly according to further disclosed aspects.

FIG. 10 illustrates a blade adapter 1000 according to still further embodiments of the present disclosure. Blade adapter 1000 shows an adapter portion 950 situated upon multi-blade mounting plate 1010. Adapter portion 950 comprises a perimeter shape 1050. Perimeter shape 1050 is configured to receive a blade having a cutout shape that matches perimeter shape 1050 (see FIGS. 11 and 13) and to reject a blade that does not have the cutout shape matching perimeter shape 1050. Additionally, perimeter shape can define asymmetric buttresses 1054A, 1054B (referred to herein collectively as asymmetric buttresses 1054A, B). Asymmetric buttresses 1054A, B have a non-symmetric shape on left and right edges thereof (as oriented when looking down at blade adapter 1000 from above). This prevents a blade having a cutout shape matching asymmetric buttresses 1054A, B from being received onto adapter portion 950 when flipped upside-down, as the left and right edges of the cutout shape will be switched (when upside-down) and will not fit conformally over asymmetric buttresses 1054A, B. In addition, adapter portion 950 can comprise dimples 1052 at a lower portion of perimeter shape 1050 from multi-blade mounting plate 1010 about halfway up along perimeter shape 1050. Dimples 1052 can prevent a blade not having corresponding dimple cutouts from being received more than halfway down perimeter shape 1050 (e.g., see FIG. 12, infra).

Figure 11:
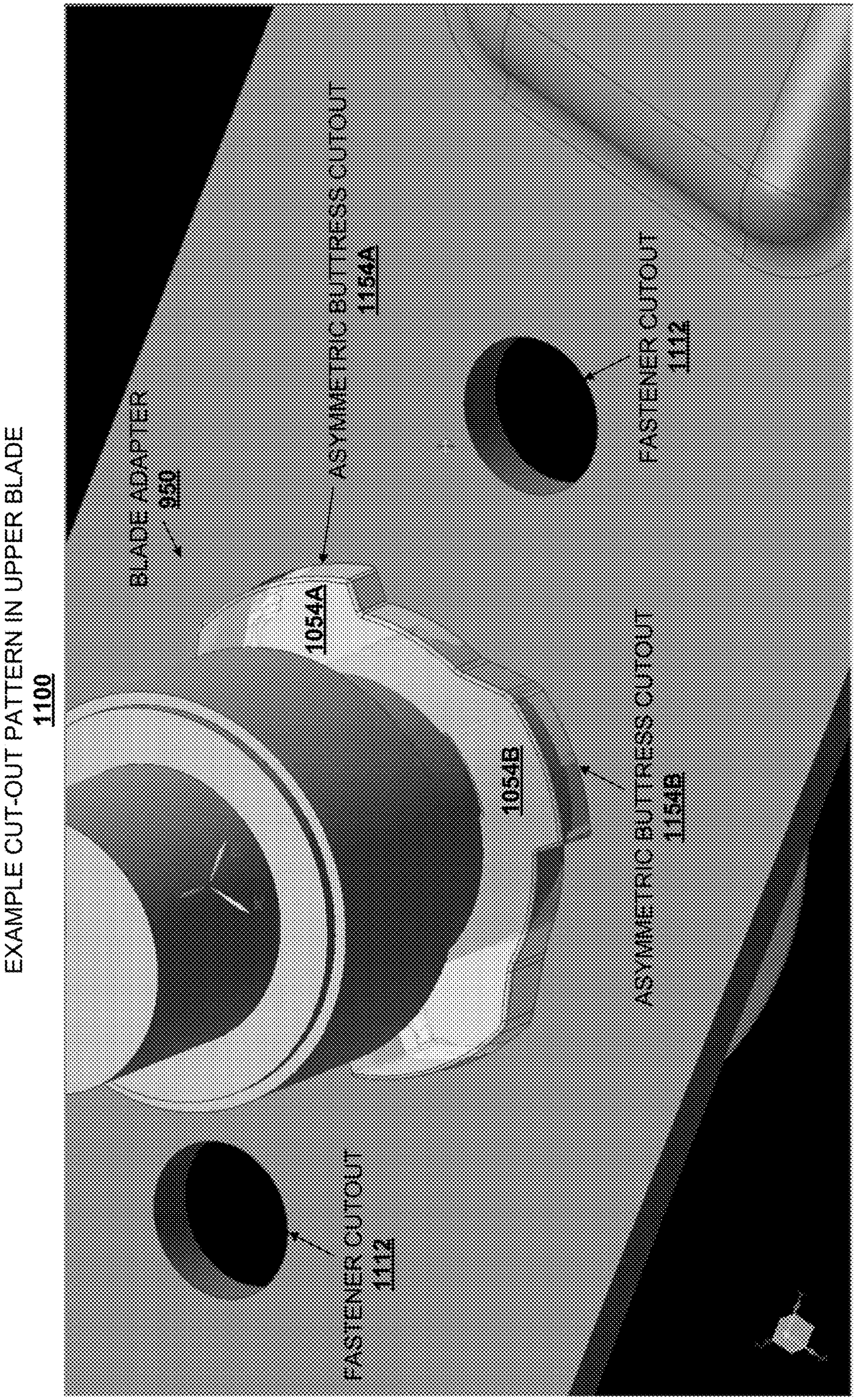
FIG. 11 illustrates an upper blade engaged with the blade adapter of FIG. 10.
Figure 12:
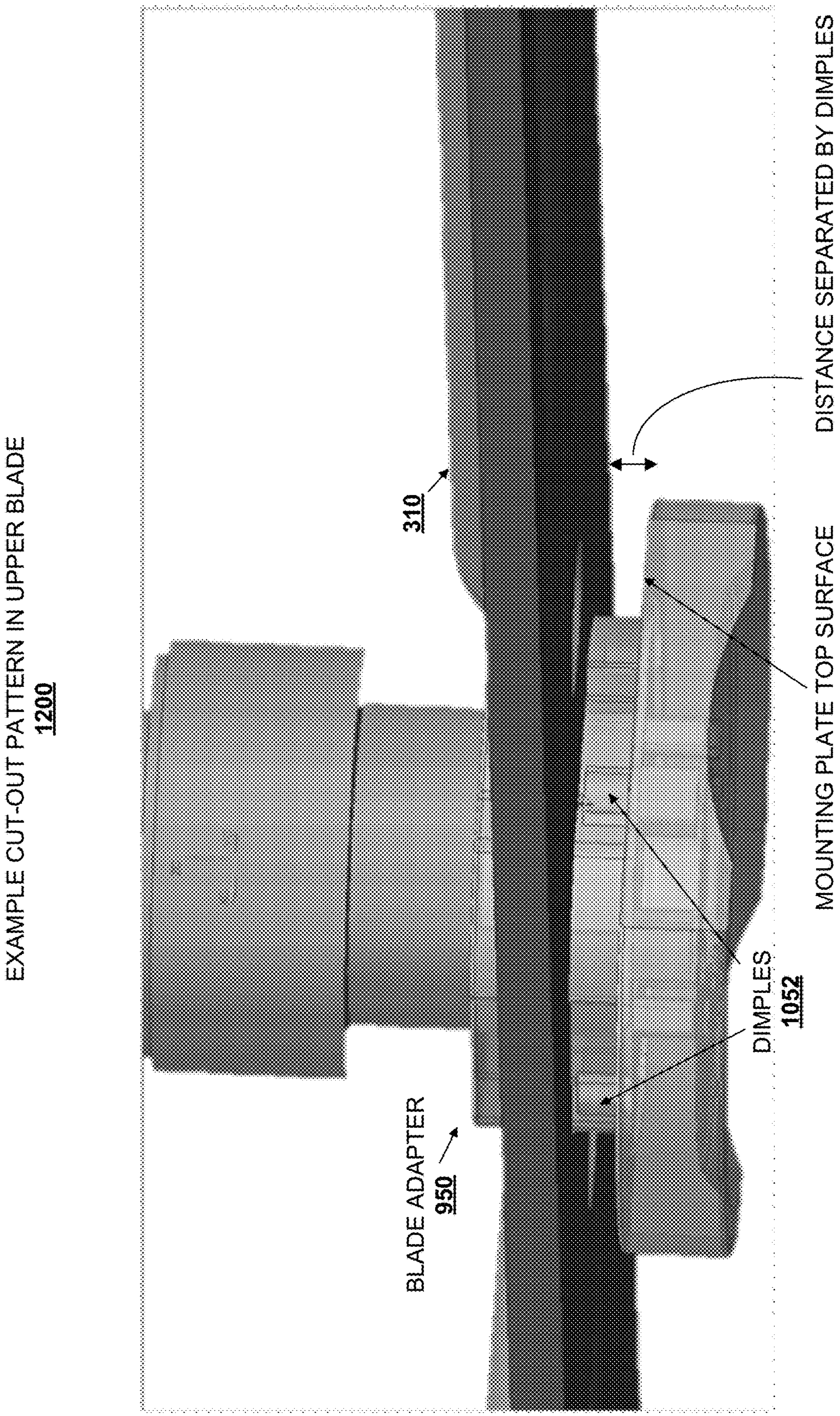
FIG. 12 illustrates a side view of the blade adapter engaged with the upper blade and the lower blade hidden, in further aspects of the disclosed embodiments.

FIG. 11 illustrates an example cut-out pattern 1100 for upper blade 310 in aspects of the present disclosure. Cut-out pattern 1100 can be configured to conformally match perimeter shape 1050 of blade adapter 950, including asymmetric buttress cutout 1154A and asymmetric buttress cutout 1154B to match asymmetric buttress 1054A and asymmetric buttress 1054B, respectively. Further, fastener cutouts 1112 are shown to receive a fastener 812 of blade adapter 1000. FIG. 12 shows a side-view 1200 of upper blade 310 seated on blade adapter 950. Upper blade 310 can be devoid of cutouts for dimples 1052 and therefore will not move along perimeter shape 1050 to a mounting plate top surface 1210. Specifically, upper blade 310 will not move past dimples 1052 as shown, and will be separated from mounting plate top surface 1210 by a distance 1220 equal to a height of dimples 1052.

Figure 13:
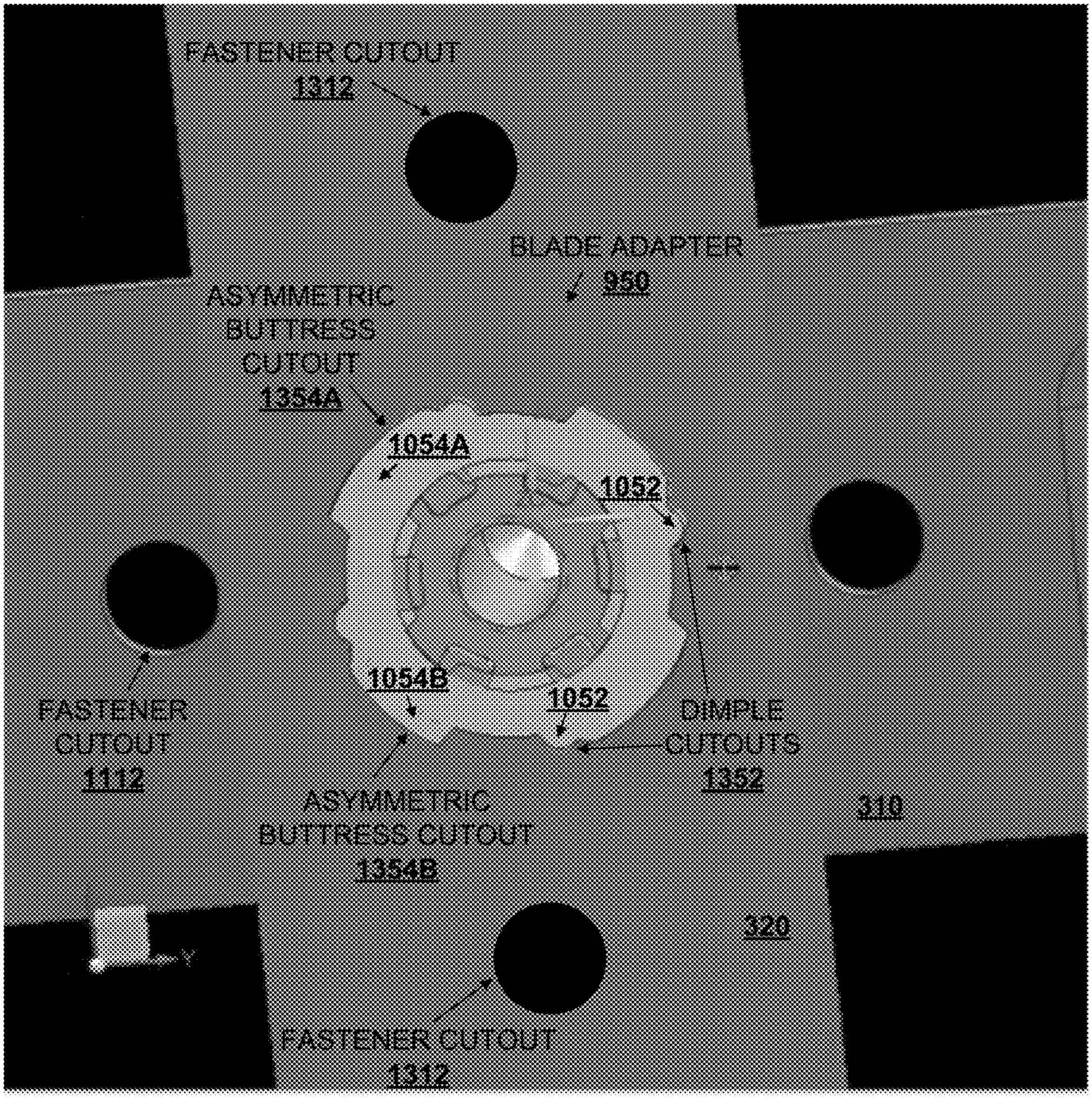
FIG. 13 illustrates a bottom view of the blade adapter engaged with the bottom blade a multi-blade assembly according to still further aspects of disclosed embodiments.
Figure 14:
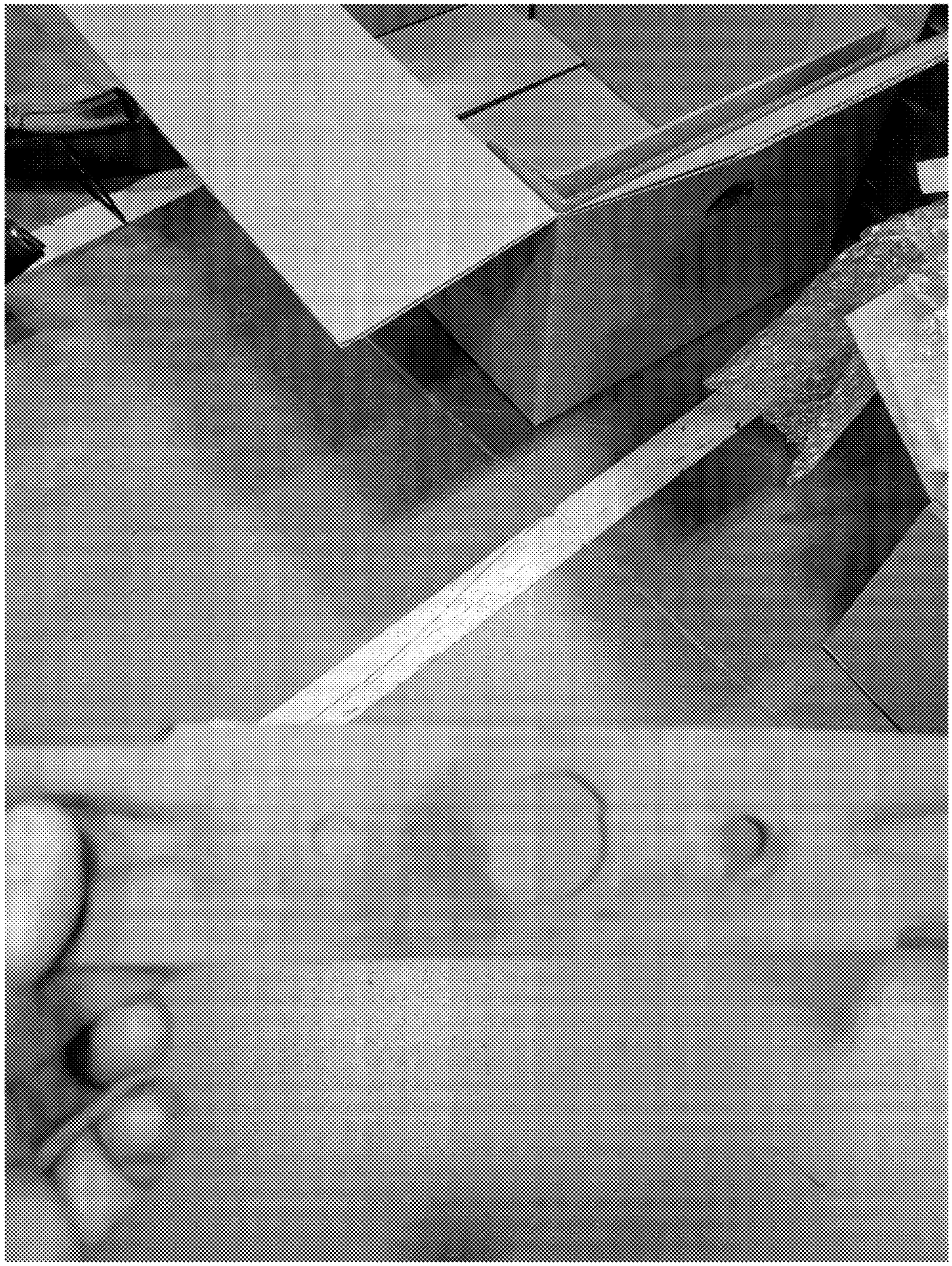
FIG. 14 depicts a close up of one aspect of a blade.
Figure 15:
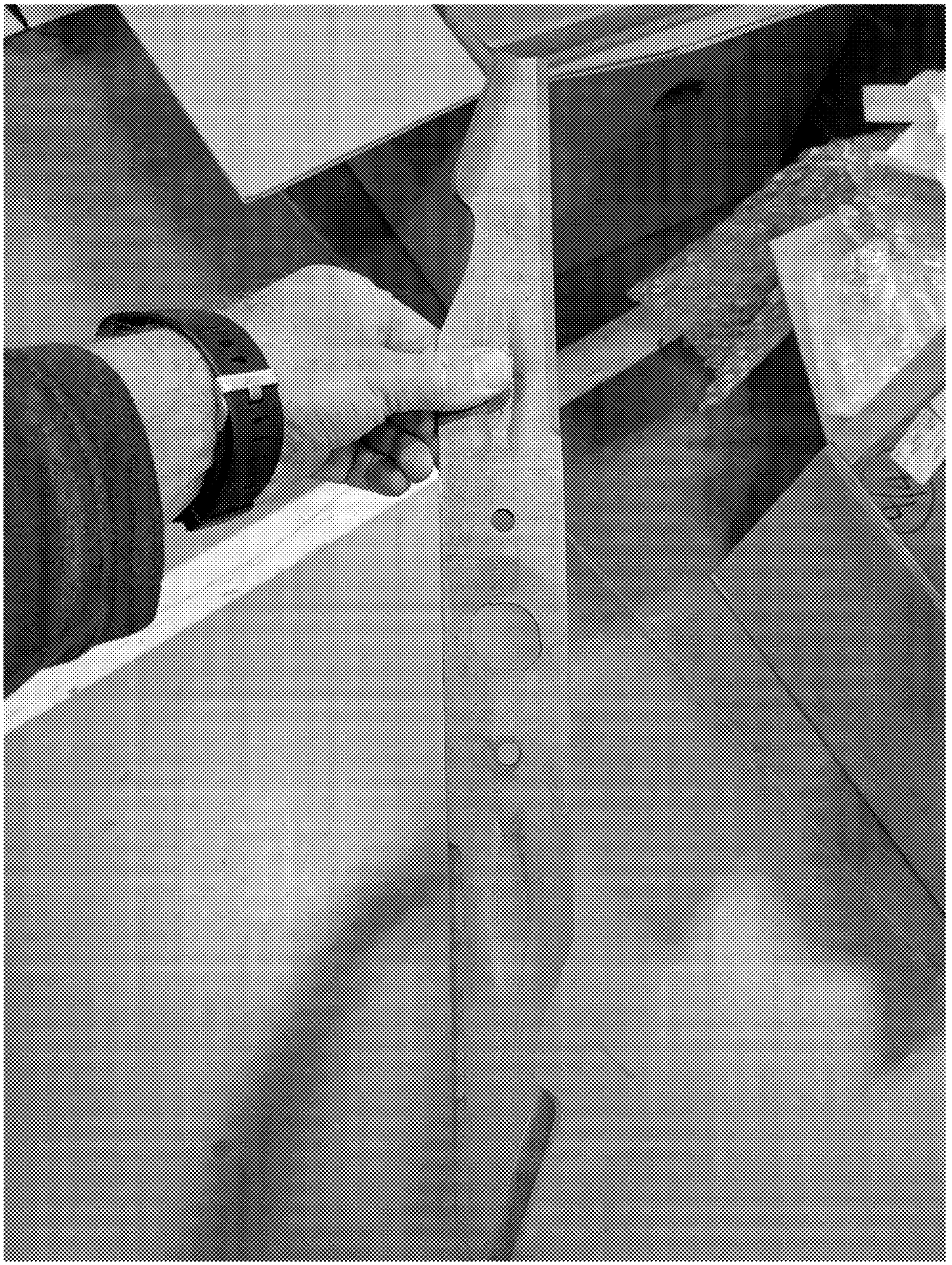
FIG. 15 depicts the blade from FIG. 14.
Figure 16:
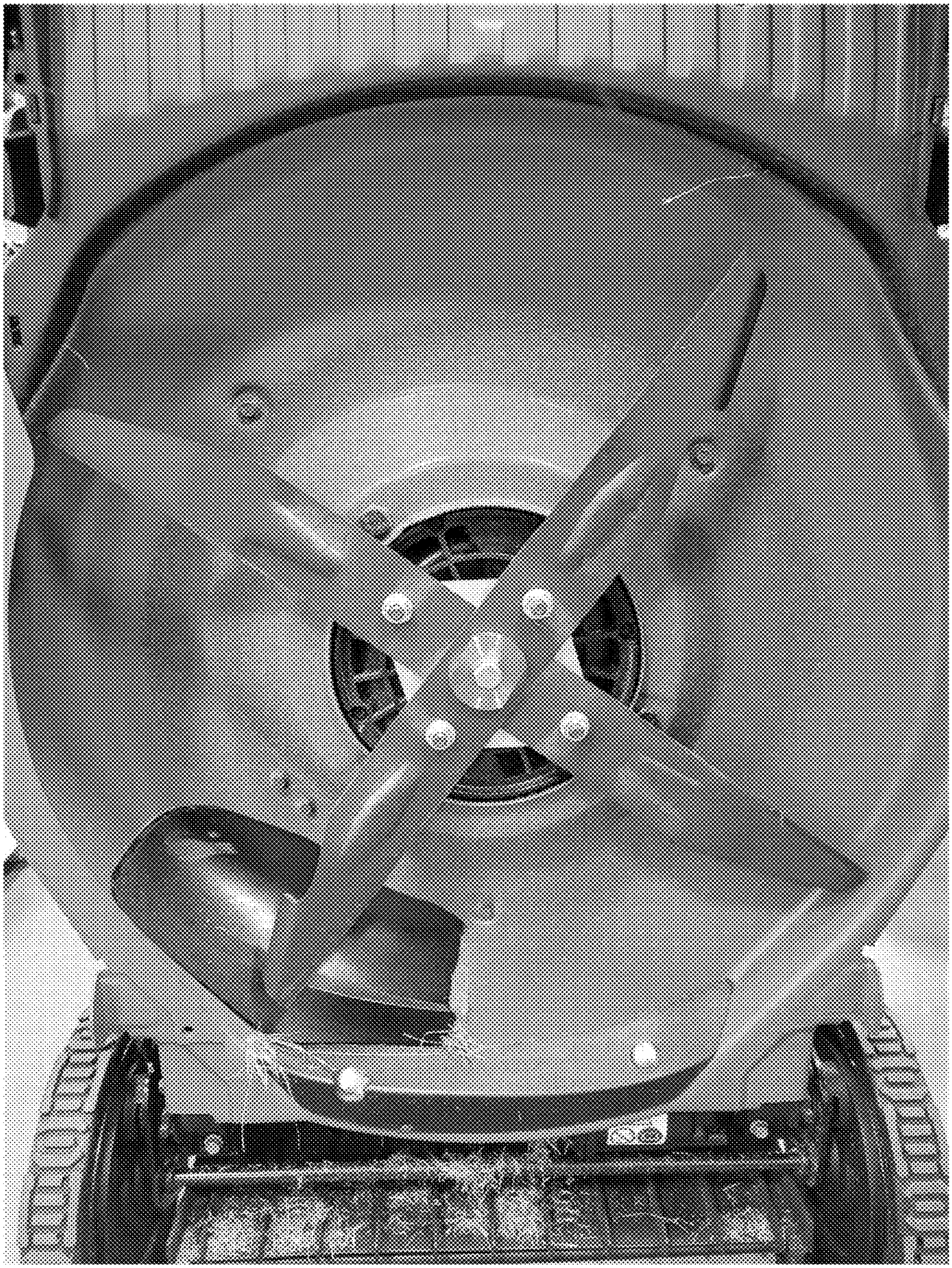
FIG. 16 depicts an underside view of a high efficiency walk-behind mowing device according to further aspects.
Figure 17:
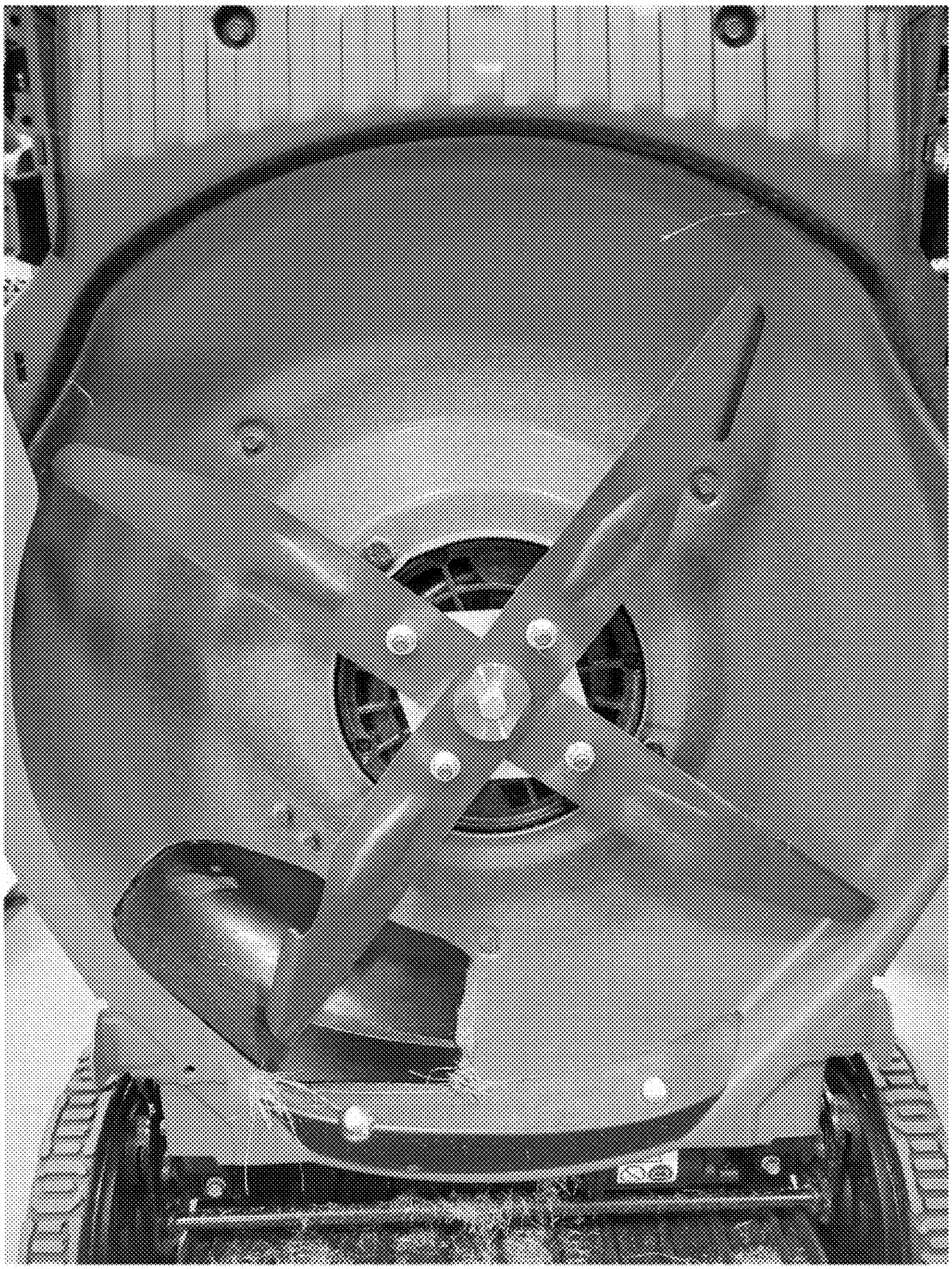
FIG. 17 depicts a slightly different angle of FIG. 16
Figure 18:
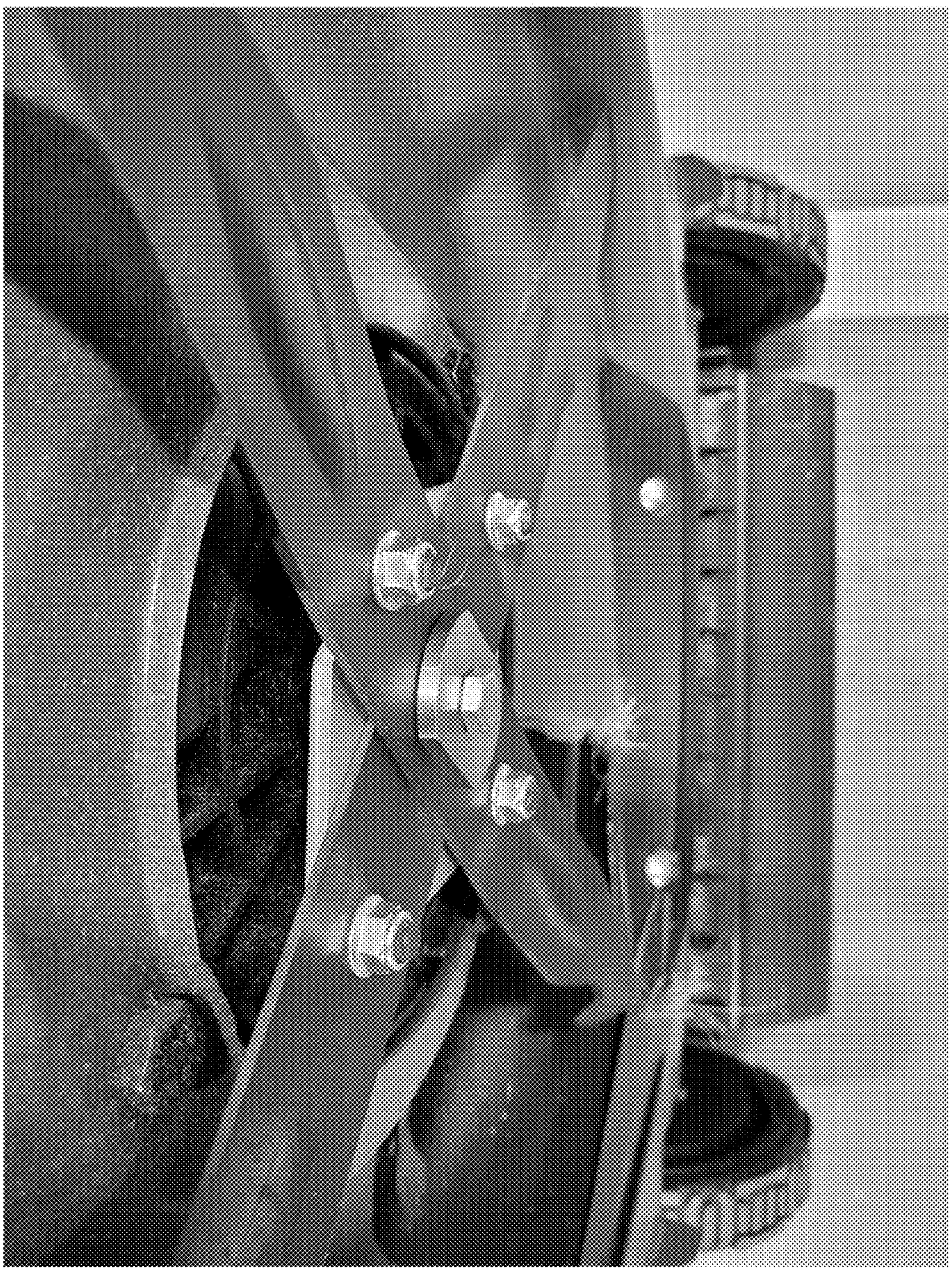
FIG. 18 depicts a different angle of FIG. 16.

Referring now to FIG. 13, an example cutout pattern 1300 for lower blade 320 is shown. Cutout pattern 1300 can comprise asymmetric buttress cutouts 1354A and 1354B to conformally match asymmetric buttress 1054A and 1054B, respectively. In addition, cutout pattern 1300 can comprise dimple cutouts 1352 to conformally match dimples 1052, allowing lower blade 320 to move along perimeter shape 1050 to mounting plate top surface 1210. As a result, lower blade 320 can be received at a bottom of adapter portion 950 resting upon mounting plate top surface 1210. In contrast, upper blade 310 is received only at an upper portion of adapter portion 950 resting upon dimples 1052. Lower blade 320 can also include fastener cutouts 1312 to receive a fastener 812 of blade adapter 1000.

In further embodiments, adapter portion 950 can have an interior surface. The interior surface can comprise an interior cutout portion to match a cutout portion on motor shaft 714 (not depicted). This interior cutout portion matching the cutout portion on motor shaft 714 can assist motor shaft 714 in driving rotation of a disclosed multi-blade assembly (e.g., multi-blade assembly, or other embodiments disclosed herein).

Generally, the illustrated embodiments are not provided as strict limitations on how the disclosed aspects can be practiced by one of ordinary skill in the art but are intended to be provided as examples that can be modified, interchanged, added to or subtracted from as would be suitable to one of ordinary skill in the art to accomplish the purposes and objectives described herein. As an example, an arrangement of components depicted in one embodiment can be swapped with components depicted in another embodiment, optionally excluding some components, or including other components illustrated in a third embodiment, according to design creativity of one of ordinary skill in the art. For instance, multi-blade assembly 300 and blade adapter 700 of FIG. 7 can be secured within mow deck 210 of FIG. 2, as part of walk-behind mower 100 of FIG. 1, as suitable. As a further example, components of disclosed devices can be implemented as connected to other components rather than included within the parent device. For instance, adapter portion 950 can be non-integrated with multi-blade mounting plate 1010 and can instead for attached thereto, or merely rest upon multi-blade mounting plate 1010 when blade adapter 1000 is assembled with upper blade 310, lower blade 320 and motor shaft 914 as illustrated in FIG. 9, for example. Alternatively, the opposite orientation can be implemented within the scope of the disclosure: one component (e.g., upper blade 310) depicted separate from another component (e.g., lower blade 320) can be aggregated as a single component in some embodiments (e.g., integrated to embody four blade-tips with a single structure). Additionally, it is noted that one or more disclosed processes can be combined into a single process providing aggregate functionality. Still further, components of disclosed machines/devices/sensors/control units can also interact with one or more other components not specifically described herein but known by those of skill in the art.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. Moreover, embodiments described in a particular drawing or group of drawings should not be limited to those illustrations. Rather, any suitable combination or subset of elements from one drawing(s) can be applied to other embodiments in other drawings where suitable to one of ordinary skill in the art to accomplish objectives disclosed herein, known in the art, or reasonably conveyed to one of ordinary skill in the art by way of the context provided in this specification. Where utilized, block diagrams of the disclosed embodiments or flow charts are grouped for ease of understanding. However, it should be understood that combinations of blocks, additions of new blocks, re-arrangement of blocks, and the like are contemplated in alternative embodiments of the present disclosure.

According to the foregoing, the present subject matter may take a variety of aspects, some of which are set out expressly below. The following aspects are exemplary and are not intended to be limiting. Ordinal language (first, second, third, etc.) used in the following merely indicates examples and to avoid confusion and is not intended to express or imply any order or hierarchy.

In a first aspect the present subject matter is a mowing apparatus comprising, an electric motor having a drive output adapted to transmit work to rotate components operationally engaged therewith about an axis of rotation; a rechargeable battery adapted to supply electrical power to the electric motor; a mow deck defining, a deck front and a deck rear offset from the deck front by a deck depth, a deck right and a deck left offset from the deck right by a deck width, a deck top and a deck bottom offset from the top by a deck height, an interior surface surrounding the axis of rotation, and a sagittal plane extending through the axis of rotation between the deck right and deck left, and a coronal plane extending through the axis of rotation between the deck front and deck rear; a blade adapter operationally engaged with the drive output and adapted to be rotated thereby about the axis of rotation in an operational direction; a multi-blade assembly secured to the blade adapter having a first blade having a first blade length, fixedly engaged with the blade mount, extending away from the axis of rotation along a first blade axis to a first blade perimeter portion, and adapted to rotate simultaneously with the blade mount around the axis of rotation to define a first blade path boundary, a second blade underlying the first blade, the second blade having a second blade length less than the first blade length, fixedly engaged with the blade mount, extending away from the axis of rotation along a second blade axis to a second blade perimeter portion, the second blade axis offset from the first blade axis by an offset angle, and adapted to rotate simultaneously with the blade mount around the second axis to define a second blade path boundary.

A second aspect is an optional form of the first aspect, wherein the first blade has a length dimension that is greater than a width dimension thereof and the first blade is flat or substantially flat along the length dimension.

A third aspect is an optional form of the first aspect, wherein the second blade is a separate and distinct structure from the first blade and is secured by the blade adapter to maintain a fixed spatial orientation relative to the first blade in response to the multi-blade assembly being rotated about the axis of rotation.

A fourth aspect is an optional form of the first aspect, wherein the first blade has a thickness of 0.125 inches and the second blade has a thickness of 0.1 inches.

A fifth aspect is an optional form of the first aspect, wherein the first blade is oriented about an axis of rotation of the multi-blade assembly at an angle to the second blade that is in a range from 70 degrees to 110 degrees and wherein the first length is greater than the second length by a difference in a range from about 0.4 inches to about 0.75 inches.

A sixth aspect is an optional form of the first aspect, wherein the second blade has a length dimension that is greater than a width dimension thereof, the length dimension defining a center portion, a medial portion and a second blade perimeter portion, and wherein the center portion is flat or substantially flat and wherein the medial portion has a curvature that extends the second blade below the center portion as the blade extends along the medial portion from the center portion to the second blade perimeter portion.

A seventh aspect is an optional form of the first aspect, wherein the second blade perimeter portion is lower than the first blade perimeter by blade height difference in a range of between 0.25 inch and 0.5 inch.

An eighth aspect is an optional form of the first aspect, wherein the first blade is a lift blade adapted to provide upward force on clippings generated during operation.

A ninth aspect is an optional form of the sixth aspect, wherein the second blade perimeter portion has an upward curvature at an end thereof providing an upward lift force on turf clippings cut by the first blade or the second blade in response to rotation of the multi-blade assembly.

A tenth aspect is an optional form of the first aspect, wherein the blade adapter further comprises: a rigid mounting plate; blade fasteners engaged with the mounting plate and adapted for securing the first blade to the mounting plate and the second blade to the mounting plate; a fastener adapted for securing the mounting plate to the drive output; and an adapter portion defining a perimeter curvature that permits conformal positioning of a blade to the blade adapter that has a curvature cutout matching the perimeter curvature.

In an eleventh aspect the present subject matter is a multi-blade assembly for a walk-behind power equipment device, comprising: a first blade elongated along a first blade axis to define a first blade center offset from a first blade edge by a first blade length; a second blade elongated along a second blade axis to define a second blade center offset from a second blade edge by a second blade length; and a blade adapter defining an axis of rotation that secures the first blade in a fixed orientation relative to the second blade, with the second blade underlying the first blade, wherein the first blade length is greater than the second blade length.

A twelfth aspect is an optional form of the eleventh aspect, wherein the first blade axis and the second blade axis extend at an angle to one another defining a vertex coincident with the axis of rotation, the angle being the range of 70 degrees to 110 degrees inclusive.

A thirteenth aspect is an optional form of the eleventh aspect, wherein the first blade is substantially flat along the first blade length.

A fourteenth aspect is an optional form of the thirteenth aspect, wherein the second blade curves downward as the second blade extends from second blade center to the second blade edge.

A fifteenth aspect is an optional form of the fourteenth aspect, wherein the first blade edge is at a first height and second blade edge is at a second height less than the first height.

A sixteenth aspect is an optional form of the fourteenth aspect, wherein the second blade edge is twisted along the second blade axis with respect to the second blade center to cause upward air movement during operational rotation about the axis of rotation.

A seventeenth aspect is an optional form of the eleventh aspect, wherein the blade adapter platform comprises: a mounting plate; one or more blade fasteners secured to the mounting plate; and an adapter portion having a perimeter shape configured to receive a blade having a blade cutout that matches the perimeter shape.

An eighteenth aspect is an optional form of the seventeenth aspect, wherein the first blade includes a first blade fastener cutout to receive a first of the one or more blade fasteners and further includes a blade cutout that matches the perimeter shape; and the second blade includes a second blade fastener cutout to receive a second of the one or more blade fasteners and further includes a blade cutout that matches the perimeter shape.

A nineteenth aspect is an optional form of the seventeenth aspect, wherein: the adapter portion includes a dimple protrusion adjacent the perimeter curvature at a top surface of the mounting plate and extending upward from the mounting plate along the perimeter curvature; the second blade includes a dimple cutout that matches the dimple protrusion allowing the second blade to seat conformally over the dimple protrusion and rest on the top surface of the mounting plate; and the first blade does not include the dimple cutout and is prevented by the dimple protrusion from movement along the perimeter curvature past the dimple protrusion.

A twentieth aspect is an optional form of the seventeenth aspect, wherein the mounting plate is confined within a perimeter of the first blade and the second blade.

Based on the foregoing it should be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A multi-blade assembly for a walk-behind power equipment device, comprising:
- a first blade elongated along a first blade axis to define a first blade center offset from a first blade edge by a first blade length;
- a second blade elongated along a second blade axis to define a second blade center offset from a second blade edge by a second blade length;
- a blade adapter defining an axis of rotation that secures the first blade in a fixed orientation relative to the second blade, with the second blade underlying the first blade, wherein the first blade length is greater than the second blade length;
- wherein the blade adapter platform comprises
  - a mounting plate,
  - one or more blade fasteners secured to the mounting plate, and
  - an adapter portion having a perimeter shape configured to receive a blade having
  - a blade cutout that matches the perimeter shape;
- the adapter portion includes a dimple protrusion adjacent the perimeter curvature at a top surface of the mounting plate and extending upward from the mounting plate along the perimeter curvature;
- the second blade includes a dimple cutout that matches the dimple protrusion allowing the second blade to seat conformally over the dimple protrusion and rest on the top surface of the mounting plate; and
- the first blade does not include the dimple cutout and is prevented by the dimple protrusion from movement along the perimeter curvature past the dimple protrusion.

* * * * *